US008730990B2

(12) United States Patent
Ghosh et al.

(10) Patent No.: US 8,730,990 B2
(45) Date of Patent: May 20, 2014

(54) METHOD, APPARATUS, AND COMPUTER PROGRAM PRODUCT FOR QUIET PERIOD MANAGEMENT IN WIRELESS NETWORKS FOR COEXISTENCE

(75) Inventors: Chittabrata Ghosh, Union City, CA (US); Klaus Franz Doppler, Berkeley, CA (US); Sumit Roy, Bothel, WA (US)

(73) Assignee: Nokia Corporation, Espoo (FI)

( * ) Notice: Subject to any disclaimer, the term of this patent is extended or adjusted under 35 U.S.C. 154(b) by 357 days.

(21) Appl. No.: 13/233,317

(22) Filed: Sep. 15, 2011

(65) Prior Publication Data

US 2013/0070605 A1   Mar. 21, 2013

(51) Int. Cl.
*H04L 12/413* (2006.01)

(52) U.S. Cl.
USPC ............................................. 370/445

(58) Field of Classification Search
USPC ......... 370/230, 229, 235, 252, 352, 345, 329, 370/338, 241, 445, 447, 473, 461, 462
See application file for complete search history.

(56) References Cited

U.S. PATENT DOCUMENTS

| | | | | |
|---|---|---|---|---|
| 6,493,334 | B1 * | 12/2002 | Krzymien et al. | 370/342 |
| 6,611,536 | B1 * | 8/2003 | Ahmed | 370/493 |
| 7,801,104 | B2 * | 9/2010 | Gaur | 370/345 |
| 2007/0183326 | A1 * | 8/2007 | Igarashi et al. | 370/230 |
| 2008/0130519 | A1 | 6/2008 | Bahl et al. | |
| 2008/0159258 | A1 * | 7/2008 | Ji et al. | 370/350 |
| 2008/0240049 | A1 * | 10/2008 | Gaur | 370/338 |
| 2011/0211616 | A1 * | 9/2011 | Taghavi Nasrabadi et al. | 375/146 |
| 2012/0113918 | A1 * | 5/2012 | Freda et al. | 370/329 |
| 2012/0257585 | A1 * | 10/2012 | Sydor et al. | 370/329 |
| 2012/0315944 | A1 * | 12/2012 | Jeon et al. | 455/512 |
| 2013/0012138 | A1 * | 1/2013 | Zhang et al. | 455/67.13 |

FOREIGN PATENT DOCUMENTS

| | | | |
|---|---|---|---|
| WO | WO 2011105764 | * | 2/2011 |
| WO | WO 2011060376 | | 5/2011 |

OTHER PUBLICATIONS

A. V. Adamis and P. Constantinou, "Intermittent-DCF: a MAC protocol for Cognitive Radios in overlay access networks," Cognitive Radio Systems, InTech, Nov. 2009, ISBN 978-953-307-021-6.
Resource Allocation for improved self-coexistence, doc.: IEEE 802.22-08/0092r06, Sep. 2008.
Chowdhury K R et al: "TP-CRAHN: a Transport Protocol for Cognitive Radio Ad-Hoc Networks", INFOCOM 2009. The 28th Conference on Computer Communications. IEEE, IEEE, Piscataway, NJ, USA, Apr. 19, 2009, pp. 2482-2490, XP031469015, ISBN: 978-1-4244-3512-8 * Abstract; sections I.-VI.*

(Continued)

*Primary Examiner* — Abdullah Riyami
(74) *Attorney, Agent, or Firm* — Locke Lord LLP

(57) ABSTRACT

Method, apparatus, and computer program product embodiments are disclosed for quiet period management in wireless networks to enhance coexistence of wireless networks with other wireless networks. An example embodiment comprises: receiving control information in a wireless message in a communications channel from another device in a wireless network; receiving a packet having a duration in the communications channel in the wireless network; delaying transmission of a packet in the communications channel for an interval determined by the received control information; monitoring an ambient electromagnetic spectrum during the interval; and competing for transmission resources in the communications channel, using a carrier sense multiple access with collision avoidance access method, after the interval.

19 Claims, 14 Drawing Sheets

Timing diagram for QP-CSMA-CA and I-DCF schemes with extended back-off and coordinated sensing period (CSP)

(56) References Cited

OTHER PUBLICATIONS

S-T Sheu et al: "A Collision-free Based Rotational Listening Strategy (RLS) for IEEE 802.15A WPAN", Proceedings of the 2007 IEEE International Conference on Communications (ICC 2007), Jun. 24-28, 2007, Glasgow, UK, IEEE, Piscataway, NJ, USA, Jun. 1, 2007, pp. 4535-4541, XP031126382, ISBN: 978-1-4244-0353-0 *Abstract; sections I.-III., V.*

Datla D et al: "An adaptive spectrum sensing architecture for dynamic spectrum access networks" IEEE Transactions on Wireless Communications, IEEE Service Center, Piscataway, NJ, US, vol. 8, No. 8, Aug. 1, 2009, pp. 4211-4219, XP011282399, ISSN: 1536-1276, DOI: 10.1109/TWC.2009.080989 * Abstract; sections I.-IV., VI., VII. *.

Extended European Search Report for Appln No. 12178580.2-1525 dated Jan. 22, 2013.

* cited by examiner

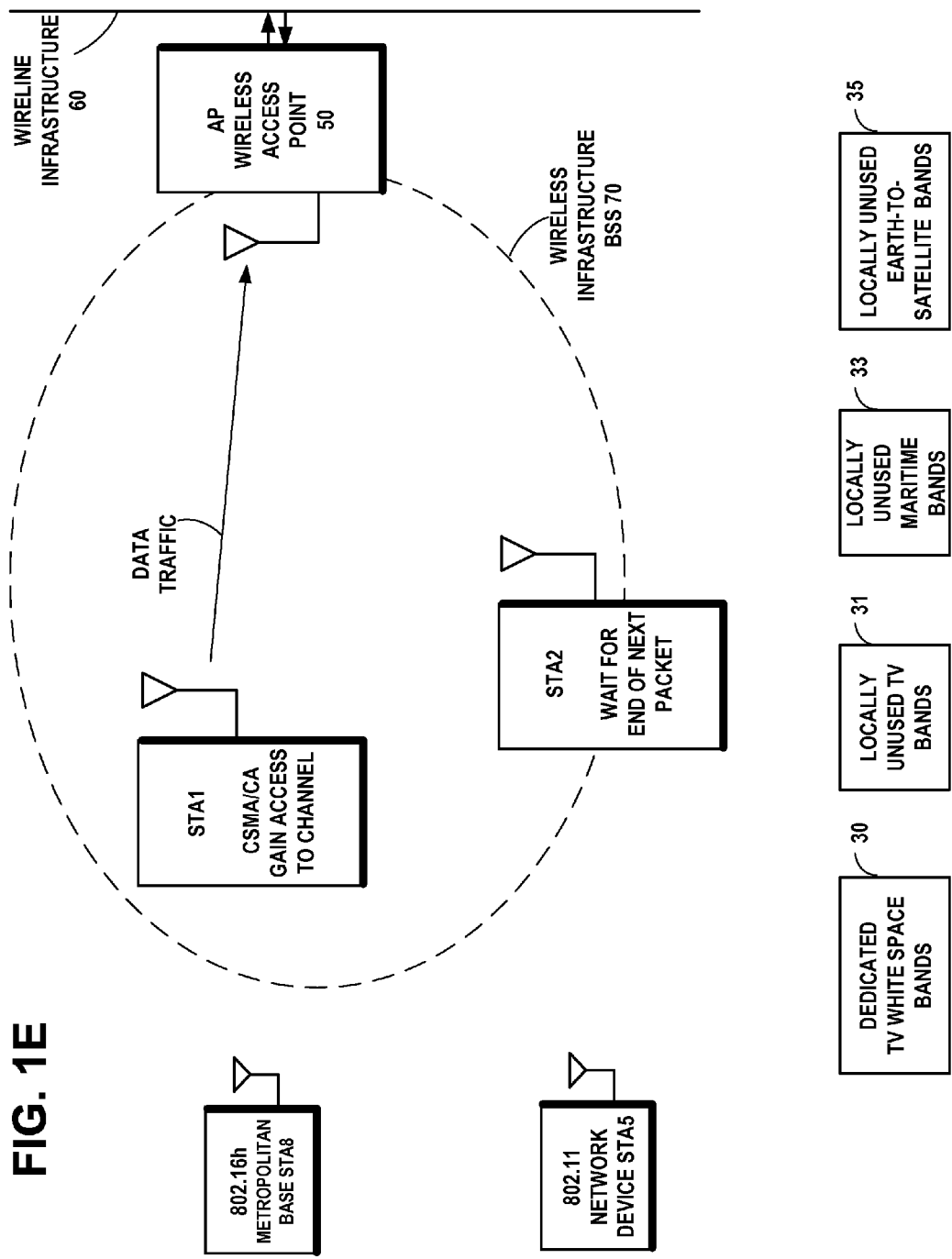

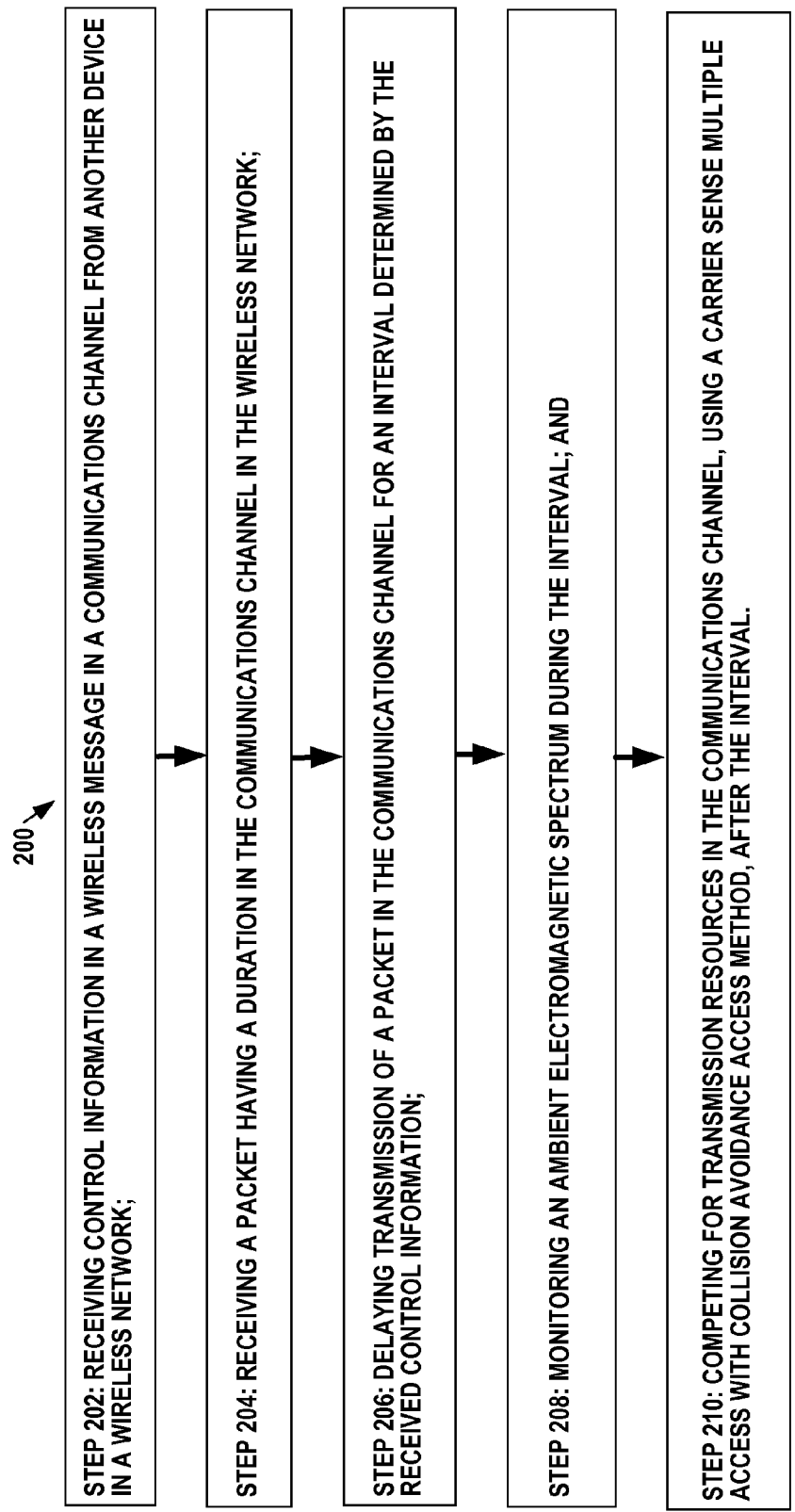

Timing diagram for QP-CSMA-CA and I-DCF schemes with extended back-off and coordinated sensing period (CSP)

CONTROL INFORMATION SCHEDULING QUIET PERIODS 100A

| STA Info Type | STA Group Address ID | CSP Start Offset | CSP Duration | CSP Interval |

Frame structure of the packet transmitted by AP for QP-CSMA-CA

US 8,730,990 B2

METHOD, APPARATUS, AND COMPUTER PROGRAM PRODUCT FOR QUIET PERIOD MANAGEMENT IN WIRELESS NETWORKS FOR COEXISTENCE

FIELD

The field of technology relates to wireless communication and more particularly to the coexistence of wireless networks.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments are disclosed for quiet period management in wireless networks to enhance coexistence with other wireless networks.

Example embodiments of the invention include a method that comprises:

receiving control information in a wireless message in a communications channel from another device in a wireless network;

receiving a packet having a duration in the communications channel in the wireless network;

delaying transmission of a packet in the communications channel for an interval determined by the received control information;

monitoring an ambient electromagnetic spectrum during the interval; and competing for transmission resources in the communications channel, using a carrier sense multiple access with collision avoidance access method, after the interval.

Example embodiments of the invention include the method wherein the competing for transmission resources further comprises monitoring the channel and if it is sensed to be busy, then further delaying transmission of a packet for a random backoff interval.

Example embodiments of the invention include the method wherein the monitoring the ambient electromagnetic spectrum during the interval comprises monitoring activity from other networks.

Example embodiments of the invention include the method wherein the wireless message is a beacon packet received in the communications channel from an access point.

Example embodiments of the invention include the method wherein the control information includes group addressing of a selected sub-plurality of a plurality of wireless devices in the network.

Example embodiments of the invention include the method wherein the control information indicates a time value when to initiate the interval.

Example embodiments of the invention include the method wherein the control information indicates a duration of the interval for detection of other networks.

Example embodiments of the invention include the method wherein the control information indicates a duration between occurrence of two consecutive ones of the intervals.

Example embodiments of the invention include the method wherein the control information indicates the interval is scheduled on a repetitive basis by the other device.

Example embodiments of the invention include the method which further comprises:

transmitting an indication of the monitored ambient electromagnetic spectrum during the interval, to the other device;

receiving a modified control information from the other device based on the transmitted indication of the monitored ambient electromagnetic spectrum;

said modified control information including a command to use one or more channels as transmission resources; and competing for transmission resources in the one or more channels, using a carrier sense multiple access with collision avoidance access method.

Example embodiments of the invention may include a computer readable medium storing program instructions, which when executed by a computer processor, perform the steps of the above recited methods.

Example embodiments of the invention may include an apparatus, comprising:

at least one processor;

at least one memory including computer program code;

the at least one memory and the computer program code configured to, with the at least one processor, cause the apparatus at least to:

receive control information in a wireless message in a communications channel from another device in a wireless network;

receive a packet having a duration in the communications channel in the wireless network;

delay transmission of a packet in the communications channel for an interval determined by the received control information;

monitor an ambient electromagnetic spectrum during the interval; and compete for transmission resources in the communications channel, using a carrier sense multiple access with collision avoidance access method, after the interval.

Example embodiments of the invention may include a method in an access point, comprising:

transmitting control information in a wireless message in a communications channel to a device in a wireless network;

said control information causing the device to delay transmission of a packet in the communications channel for an interval following termination of a preceding packet in the channel, the interval determined by the control information, to enable the device to monitor an ambient electromagnetic spectrum during the interval; and receiving an indication of the monitored ambient electromagnetic spectrum during the interval, from the device.

Example embodiments of the invention may include the method in the access point, further comprising:

transmitting a modified control information to the device based on the received indication of the monitored ambient electromagnetic spectrum;

said modified control information including a command to use one or more channels as transmission resources.

Example embodiments of the invention may include a computer readable medium storing program instructions in an access point, which when executed by a computer processor, perform the steps of the above recited methods.

Example embodiments of the invention may include an access point apparatus, comprising:

at least one processor;

at least one memory including computer program code;

the at least one memory and the computer program code configured to, with the at least one processor, cause the apparatus at least to:

transmit control information in a wireless message in a communications channel to a device in a wireless network;

said control information causing the device to delay transmission of a packet in the communications channel for an interval following termination of a preceding packet in the channel, the interval determined by the control information, to enable the device to monitor an ambient electromagnetic spectrum during the interval; and receive an indication of the monitored ambient electromagnetic spectrum during the interval, from the device.

The resulting embodiments for quiet period management in wireless networks, enhance coexistence with other wireless networks.

DESCRIPTION OF THE FIGURES

FIG. 1E shows the example network diagram of FIG. 1A, wherein the one of the client wireless devices has succeeded in gaining access to the channel using the CSMA/CA extended backoff contention, according to an example embodiment of the invention.

FIG. 2 is an example flow diagram of operational steps in the client WLAN device STAT, for quiet period management in wireless networks to enhance coexistence with other wireless networks, according to an embodiment of the present invention.

DISCUSSION OF EXAMPLE EMBODIMENTS OF THE INVENTION

Figure 1A:
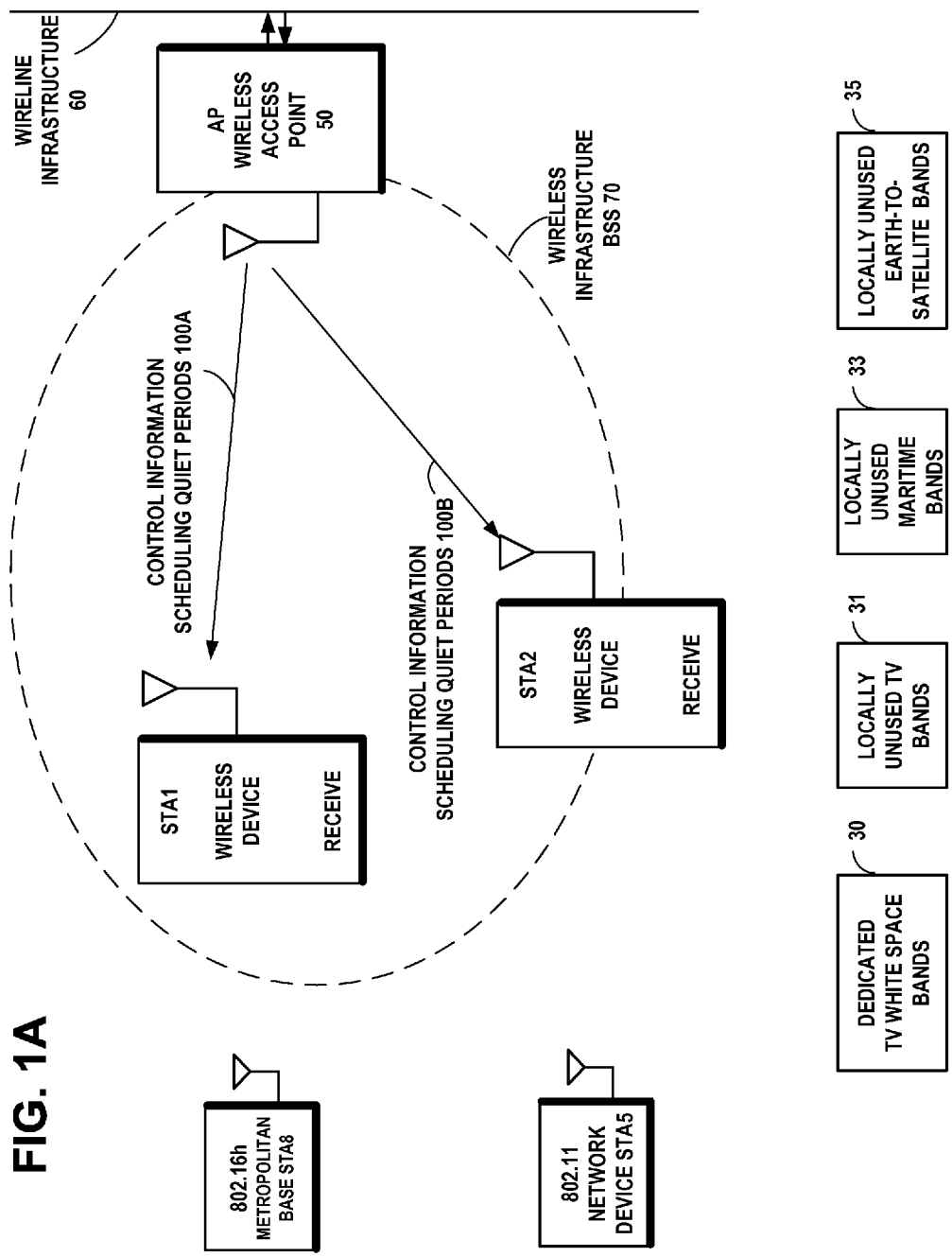
FIG. 1A is an example network diagram of a wireless network, with an access point and two client wireless devices, wherein control information to schedule quiet periods is received by the client devices from the access device, according to an example embodiment of the invention.

This section is organized into the following topics:
A. Coexistence with Other Wireless Networks
B. WLAN Communication Technology C. Quiet Period Management in WLANs for Coexistence With Other Wireless Networks D. Access Point with Coexistence Manager for Quiet Period Management in WLANs for Coexistence With Other Wireless Networks A. Coexistence with Other Wireless Networks In order to co-exist with other networks, the wireless stations need to be aware of other networks operating in the same desired channel. This awareness is typically created by sensing the spectrum, thereby detecting coexisting stations from networks of same or different technology. An active station, before data transmission, may use a conventional carrier sensing mechanism in WLAN networks, to detect possible transmissions from any other station within its own channel. Example embodiments of the invention extend of the traditional carrier sensing technique for wireless stations in order to detect other networks in the same radio technology and other networks using a different radio technology operating on the desired channel.

Example embodiments of the invention are generally applicable to all wireless frequency bands. They may be applied, for example, in the unlicensed ISM bands or in licensed bands. When wireless networks operate on the same channel, their coexistence may be improved by reallocating at least one network to a different channel or band. The channel or band may be either within the same radio technology, called homogeneous coexistence, or in a different radio technology, called heterogeneous coexistence. One example of heterogeneous coexistence is reallocation of wireless LANs operating in the 900 MHz ISM band to white space bands, such as the TV white space bands.

Use of radio frequency bands of the electromagnetic spectrum is regulated by governments in most countries, by allocating specific frequency bands to particular types of uses, such as licensed bands for commercial radio and television broadcasting, cellular telephony, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. The unassigned frequency bands and guard bands are referred to as white spaces.

White space bands may be broadly defined as broadcast RF spectrum that is unused by licensed services. There are at least two categories of white space bands: [1] Dedicated TV white space is a portion of the spectrum that the FCC has reallocated to unlicensed use from previously analog broadcast usage, and [2] Locally unused spectrum by licensed broadcasters in a geographic area. In some cases, the absence of a primary licensed user from use of a white space band may only be temporary and upon the return of the primary user, secondary users must relinquish their use of the white space band.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed broadcasters: The FCC has adopted rules to allow unlicensed radio transmitters to operate in the broadcast television spectrum at locations and times where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the white space bands may require new techniques for fairly sharing the available bandwidth among different secondary networks and accord the required preference for primary users of the band. Such new techniques may require some form of communication between the secondary networks to enable a fair usage of the local spectrum.

B. WLAN Communication Technology

The IEEE 802.11 standard specifies methods and techniques of an exemplary wireless local area network (WLAN) operation. examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard *IEEE 802.11-2007, Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11 ac, and the planned IEEE 802.11 ad WLAN specifications that are to provide a very high throughput in higher frequency bands. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11ah WLAN standard is being developed for operation in the 900 MHz ISM band and will have a greater range and lower obstruction losses due to its longer wavelength.

According to an example embodiment, an IEEE 802.11 WLAN may be organized as an independent basic service set (IBSS) or an infrastructure basic service set (BSS). The access point (AP) in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point (AP) in an Infrastructure BSS may bridge traffic out of the BSS onto a distribution network. STAs that are members of the BSS may exchange packets with the AP.

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

According to an example embodiment, an IEEE 802.11 WLAN may also be organized as an independent basic service set (IBSS). Wireless devices in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format may be identical to that of an IEEE 48-bit address. In an ad hoc network, the BSSID may be a locally administered, individual address that is generated randomly by the device that starts the ad hoc network.

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TGTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

C. Quiet Period Management in WLANs for Coexistence with Other Wireless Networks In order to co-exist with other networks, the 802.11 stations need to be aware of other networks operating in the same desired channel. This awareness is typically created by sensing the spectrum, thereby detecting coexisting stations from networks of same or different technology. An active station, before data transmission, uses conventional carrier sensing mechanism in WLAN networks, to detect possible transmissions from any other station within its own network. Example embodiments of the invention extend of the traditional carrier sensing technique for the 802.11 stations in order to detect 802.11 networks and other networks using a different radio technology operating on the desired channel.

In accordance with an example embodiment, a detection mechanism, termed here as quiet-period carrier sense multiple access-collision avoidance (QP-CSMA-CA), is proposed for the IEEE 802.11 WLAN stations in a wireless local area network (WLAN) operating in a particular band, such as the 900 MHz ISM band.

In accordance with an example embodiment, additional functional elements may be provided in the beacon packet that an access point (AP) will broadcast to its corresponding stations. This beacon packet may facilitate scheduling quiet periods (QPs) and minimize the number of packets required to be broadcast.

In accordance with an example embodiment, an AP may allow sensing by only a selected number of stations and thus, reducing power consumption.

Example embodiments of the invention may be also applied in an IEEE 802.11 independent basic service set (IBSS) operating as an ad hoc network, without an access point, as discussed in greater detail, below.

In order to detect interfering networks, a WLAN network needs to have a coordinated sensing period (CSP) with no data transmissions within its own network. In accordance with an example embodiment, the QP-CSMA-CA technique exploits the backoff phase (and not the data transmission phase) for CSP. CSPs are scheduled on a repetitive basis as a quiet period by the constituent AP. These QPs will result in extended backoff intervals when compared to traditional backoff phases in CSMA-CA.

1. Data fragmentation is avoided since the QPs are scheduled in the backoff phase, as opposed to sensing in the transmission phase;

2. The AP utilizes a-priori information of spectrum usage before scheduling the QPs. The QP duration and sensing intervals, based on spectrum usage, are computed and adjusted by the AP. The AP communicates these parameters occasionally, using the periodic beacon signals or broadcasting a dedicated request for QP-CSMA-CA.

FIG. 1A is an example network diagram of a WLAN wireless network 70, with an access point 50 and two client wireless devices STA1 and STA2, wherein control information 100A and 100B to schedule quiet periods, is received by the client devices from the access point device, according to an example embodiment of the invention.

In example embodiments of the invention, the two wireless client devices STA1 and STA2 may operate where one wireless device STA1 communicates with other wireless device STA2 through the access point 50. In other example embodiments of the invention, two wireless client devices STA1 and STA2 may communicate directly with each other and receive coordination from the access point 50. The access point 50 may be connected to a wireline infrastructure 60.

The access point 50 and its two wireless client devices STA1 and STA2 may be IEEE 802.11 WLAN devices operating, for example, in the 900 MHz ISM band or in the 2.4 GHz ISM band, according to the principles of the *IEEE 802.11-2007, Wireless Medium Access Control (MAC) and Physical Layer (PHY) Specifications*, June 2007. Wireless local area networks (WLANs) operating in the unlicensed 900 MHz band will operate, for example, according to the IEEE 802.11ah WLAN standard now being developed. The 900 MHz ISM band will have an extended range and will have relatively lower obstruction losses due to its longer wavelength. The access point 50 and its two wireless client devices STA1 and STA2 may be based on other example 802.11 WLAN standards such as IEEE 802.11b and 802.11g, for example, which have been a common technology for traditional WLAN applications in the 2.4 GHz ISM band and have a nominal range of 100 meters.

The access point 50 and its two wireless client devices STA1 and STA2 may be based on other example 802.11 WLAN standards, for example, on the IEEE 802.11n, IEEE 802.11ac, or IEEE 802.11ad WLAN specifications that are to provide a very high throughput in higher frequency bands.

Applications of these IEEE 802.11 standards include products such as consumer electronics, telephones, personal computers, and access points for both for home and office.

In example embodiments of the invention, the control information 100A and 100B to schedule quiet periods, may be contained in a beacon packet received in the communications channel from the access point. The control information may include group addressing of a selected sub-plurality of a plurality of wireless devices in the network. The control information may indicate a time value when to initiate the interval. The control information may indicate a duration of the interval for detection of multiple networks. The control information may indicate a duration between occurrence of two consecutive ones of the intervals.

In example embodiments of the invention, the control information 100A and 100B to schedule quiet periods, may be contained in a management frame other than a beacon, received in the communications channel from the access point.

FIG. 1A further illustrates the WLAN wireless network 70 being interfered with by a wireless metropolitan area network base station STA8 and a wireless local area network STA5. FIG. 1A further illustrates the local availability of several types of white space bands for heterogeneous coexistence, according to an example embodiment.

FIG. 1A illustrates an example of other networks whose signals may interfere with the WLAN wireless network 70. For example, device STA5 is based on the IEEE 802.11ah WLAN standard operating in the 900 MHz ISM band and has a coverage area overlapping the IEEE 802.11 WLAN wireless network 70. As another example, the coverage of an IEEE 802.16h wireless metropolitan area network (WMAN) operating in the 2-11 GHz range, may interfere with the IEEE 802.11 WLAN wireless network 70. An IEEE 802.16h WMAN base station STA 8 exchanges wireless broadband messages with other IEEE 802.16h WMAN stations in a WMAN network that overlaps the IEEE 802.11 WLAN wireless network 70.

Example embodiments of the invention are generally applicable to all wireless frequency bands. They may be applied, for example, in the unlicensed ISM bands or in licensed bands. When wireless networks operate on the same channel, their coexistence may be improved by reallocating at least one network to a different channel or band. The channel or band may be either within the same radio technology, called homogeneous coexistence, or in a different radio technology, called heterogeneous coexistence. One example of heterogeneous coexistence is reallocation of wireless LANs operating in the 900 MHz ISM band to white space bands, such as the TV white space bands.

In example embodiments of the invention, the WLAN access point 50 may exchange wireless broadband messages with IEEE 802.11 client devices STA1 and STA2, such as personal computers or PDAs over the WLAN wireless network 70. Both IEEE 802.11 WLAN access point 50 and the IEEE 802.11 client devices STA1 and STA2 may be interfered with by the IEEE 802.16h WMAN STA 6. The WLAN access point 50 and the IEEE 802.11 client devices STA1 and STA2 may be TV white space (TVWS) devices, meaning that they may be equipped to communicate over the dedicated TV band white space 30. Similarly, the IEEE 802.16h WMAN STA 8 base station and its other IEEE 802.16h WMAN network stations may be TV white space (TVWS) devices, meaning that they may be equipped to communicate over the dedicated TV band white space 30. Thus, the interference by the IEEE 802.16h WMAN STA 6 of both the IEEE 802.11 WLAN access point 50 and the IEEE 802.11 client devices STA1 and STA2 may be ameliorated by reallocating the IEEE 802.11 frames from the IEEE 802.11 WLAN wireless network 70 to the TV band white space 30. The dedicated TV band white space 30 may be shared by many terminals using diverse communication protocols. For example, if the IEEE 802.16h WMAN network reaches its maximum capacity, the traffic congestion may be alleviated by reallocating the IEEE 802.16h frames to the TV band white space 30.

Other network topologies may make use of example embodiments of the invention, for example more heterogeneous networks, each of which has an Internet connection that they may use first for neighboring network discovery.

FIG. 1A also shows three example white space bands locally unused by licensed primary users of their respective RF spectrum white spaces, which may be used by the WLAN access point 50 or client devices STA1 and STA2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. An example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the WLAN access point 50 or client devices STA1 and STA2, then they could operate as unlicensed secondary users and make use of TV band white space 31. If either STA1 or STA2 were to detect a signal transmitted from a neighboring TV broadcaster in band 31, then they would have to relinquish their use of the TV band white space 31.

A maritime radio operates in a number of licensed frequency allocations and is a primary user in the maritime radio band 33. If there were no licensed maritime radios in operation that would interfere with the WLAN access point 50 or client devices STA1 and STA2, then they could operate as unlicensed secondary users and make use of maritime radio band 33. If either STA1 or STA2 were to detect a signal transmitted from a neighboring maritime radio, then they would have to relinquish their use of the maritime band 33.

A satellite earth station transmits to satellites in licensed frequency allocations from 2.025 GHz to 2.110 GHz and is a primary user in the earth-to-satellite band 35. If there were no licensed earth station radios in operation that would interfere with the WLAN access point 50 or client devices STA1 and STA2, then they could operate as unlicensed secondary users and make use of earth-to-satellite radio band 35. If either STA1 or STA2 were to detect a signal transmitted from a neighboring earth station radio, then they would have to relinquish their use of the earth-to-satellite band 35.

Figure 1B:
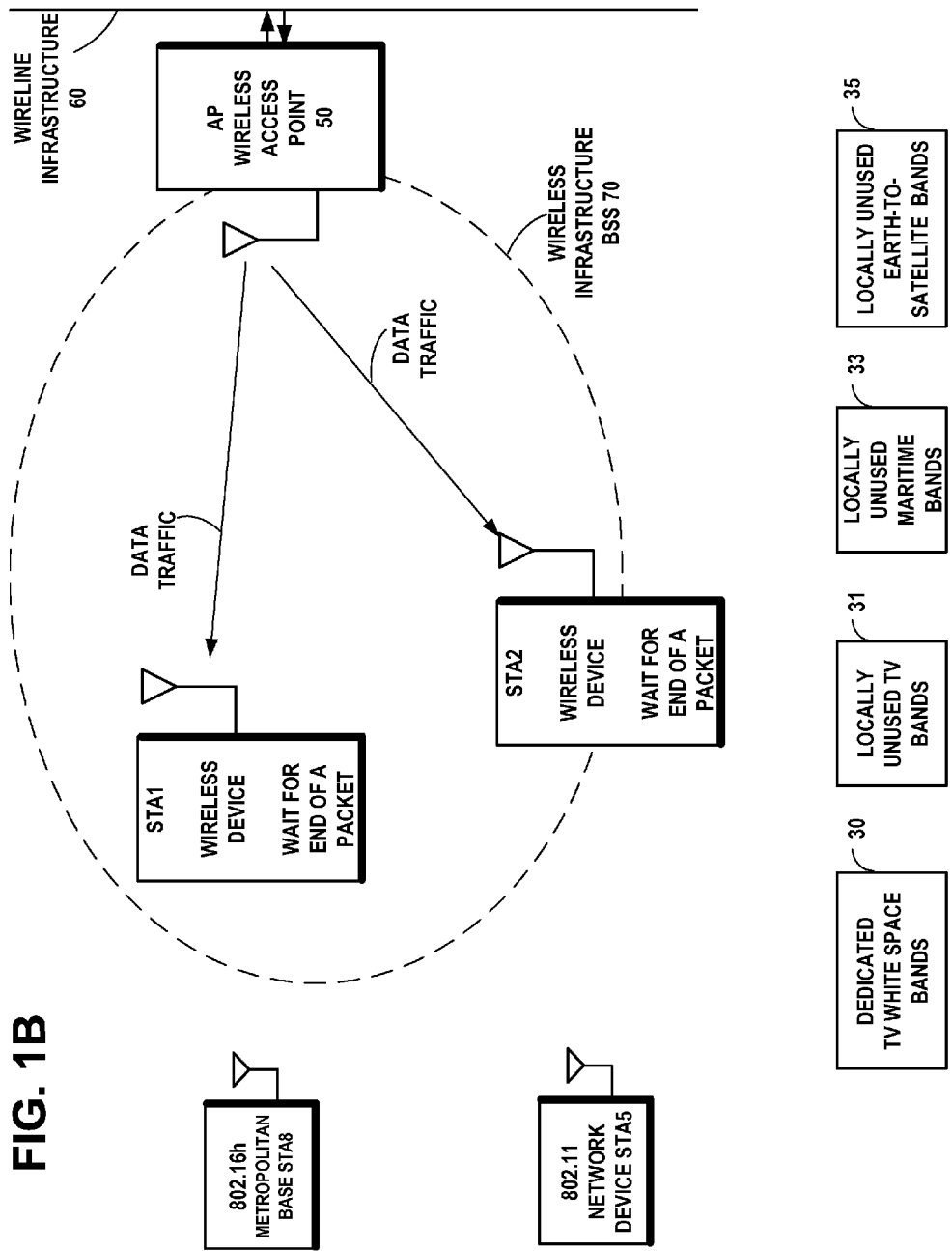
FIG. 1B shows the example network diagram of FIG. 1A, wherein the two client wireless devices wait for end of a received packet in the channel, according to an example embodiment of the invention.

FIG. 1B shows the example network diagram of FIG. 1A, wherein the two client wireless devices STA1 and STA2 wait for the end of a received packet in the channel, according to an example embodiment of the invention. When the two client wireless devices STA1 and STA2 receive a valid frame, they update their NAV with the information received in the duration field for all frames where the new NAV value is greater than the current NAV value, including the RTS and CTS packets, as well data packets. The value of the NAV decrements with the passage of time. The last acknowledgement packet (ACK) contains a NAV value of zero, to immediately release the channel.

The IEEE 802.11 specification defines standard spacing intervals that delay the two client wireless devices STA1 and STA2 access to the medium, between the end of the last symbol of the previous frame and the beginning of the first symbol of the next frame. The short interframe space (SIFS), the shortest of the interframe spaces, allows acknowledgement (ACK) frames and clear to send (CTS) frames to have access to the medium before others. The longer duration distributed coordination function (DCF) interframe space (IFS) or DIFS interval is used for transmitting data frames and management frames.

After the channel has been released, the two client wireless devices STA1 and STA2 employ a spectrum sensing capability during the SIFS interval or DIFS interval, to detect whether a carrier signal is present indicating the channel is busy. A carrier sensing scheme is used wherein the two client wireless devices STA1 and STA2 wishing to transmit data must first listen to the channel for a predetermined DIFS or SIFS amount of time to determine whether or not another node is transmitting on the channel within the wireless range.

Figure 1C:
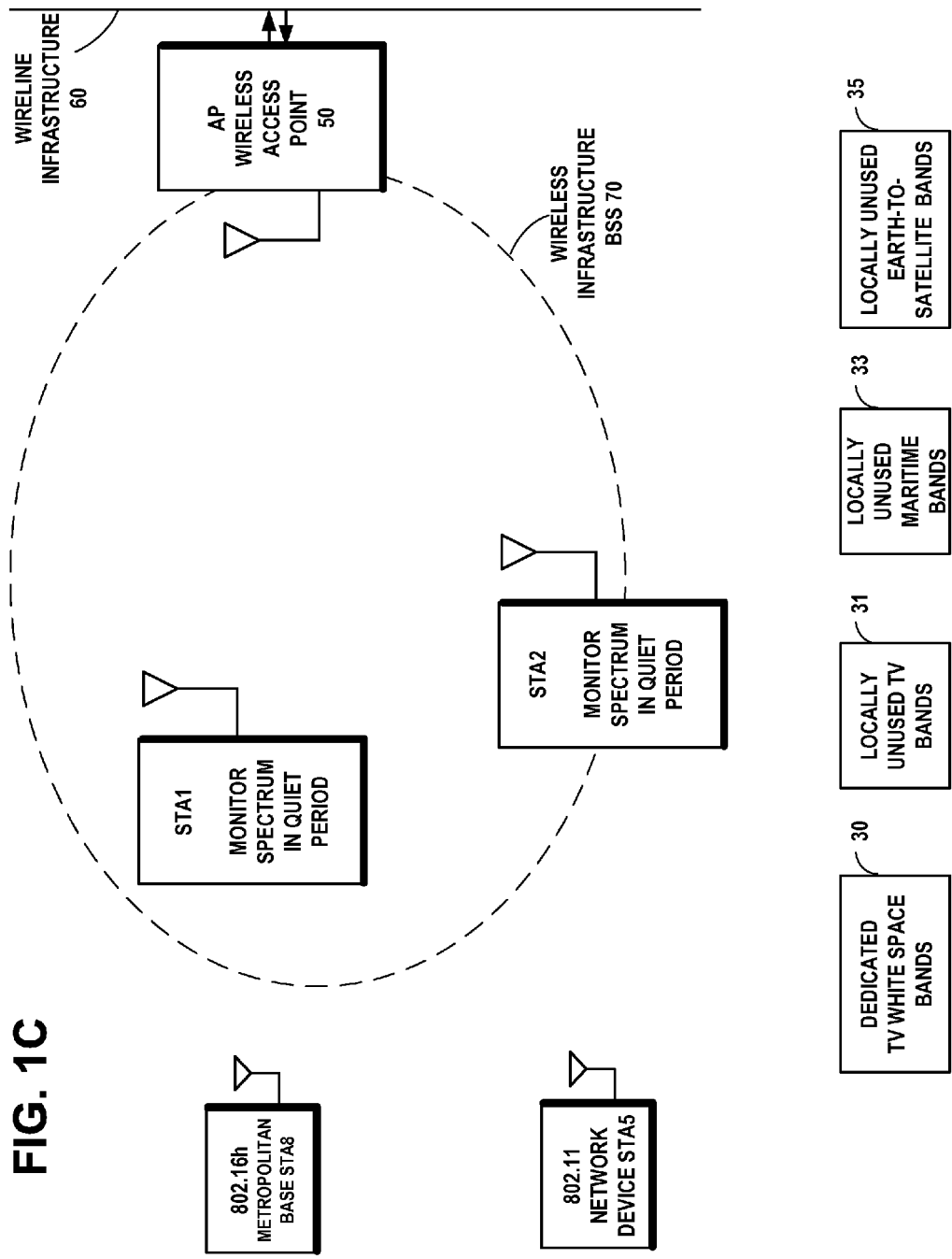
FIG. 1C shows the example network diagram of FIG. 1A, wherein the two client wireless devices monitor the ambient spectrum during the quiet period, according to an example embodiment of the invention.

FIG. 1C shows the example network diagram of FIG. 1A, wherein the two client wireless devices STA1 and STA2 monitor the ambient spectrum during the quiet period, according to an example embodiment of the invention. A detection mechanism, termed here as quiet-period carrier sense multiple access-collision avoidance (QP-CSMA-CA), is used for the IEEE 802.11 WLAN stations in a wireless local area network (WLAN) operating in a particular band. The WLAN network may operate in any of the aforementioned bands, such as the 900 MHz ISM band.

In order to detect interfering networks, a WLAN network needs to have a coordinated sensing period (CSP) with no data transmissions within its own network. In accordance with an example embodiment, the QP-CSMA-CA technique exploits the backoff phase (and not the data transmission phase) for CSP. CSPs are scheduled on a repetitive basis with the quiet period by the constituent AP. These QPs will result in extended backoff intervals when compared to traditional backoff phases in CSMA-CA. The CSP=Quiet Period may also be scheduled in IBSS ad-hoc networks, for example, all nodes may schedule and change quiet period scheduling or one of the nodes may have a special role to schedule the quiet periods.

In accordance with an example embodiment, QP-CSMA-CA does not employ dedicated sensing durations within the data transmission intervals. QP-CSMA-CA exploits the existing random and exponential backoff periods for coordinated sensing, defined for conventional CSMA-CA mechanism, for the detection of already operating homogeneous (same radio technology) and heterogeneous (different radio technology) wireless networks in the same channel.

In accordance with an example embodiment, QP-CSMA-CA provides the CSP as part of the backoff phase of active 802.11 stations. The CSP is performed by all the designated stations in every CSP interval and it is scheduled by the AP. In accordance with an example embodiment, the duration of the proposed backoff with a guaranteed sensing duration or QP is larger than the regular backoff period.

In accordance with an example embodiment, QP-CSMA-CA performs carrier sensing in the backoff phase, thereby enhancing spectrum utilization and avoiding data fragmentation. The data packet is not fragmented because the sensing only starts after the transmission has finished.

In accordance with an example embodiment, QP-CSMA-CA may allow the AP to broadcast only once a fixed pattern of repetitive sensing, so that the AP only needs to signal increased or decreased sensing durations and CSP intervals.

In accordance with an example embodiment, QP-CSMA-CA may allow the AP to designate a selected number of stations to perform QP-CSMA-CA, based on either the power management bit (set to zero for sleeping stations and one for active stations) or previously received reports of sensing from the stations. This selection is controlled by the AP.

In accordance with an example embodiment, the QP-CSMA-CA sensing mechanism may provide a solution for WLAN stations with Long Term Evolution (LTE) coexistence in the white space bands.

In accordance with an example embodiment, the QP-CSMA-CA mechanism senses the channel at the initiation of the scheduled backoff phase for CSP after the DIFS period (for synchronization). During the backoff duration, the stations effectively listen (sense) the channel for idle durations. This sensing is to detect ongoing transmissions from own or other WLAN networks.

In accordance with an example embodiment, the following steps are provided within the backoff period to accommodate a CSP for sensing other networks:

Introduce CSP on a repetitive basis within backoff, where the duration (for example, a duration of few ms, i.e., sensing frequently) and repetition rate is determined by the AP;

The AP schedules the CSPs and their intervals based on spectrum usage information;

Synchronize all the stations to initiate CSP at the end of the DIFS period after completion of current data transmissions;

Stations detect own and other coexisting networks during the CSP.

Figure 1D:
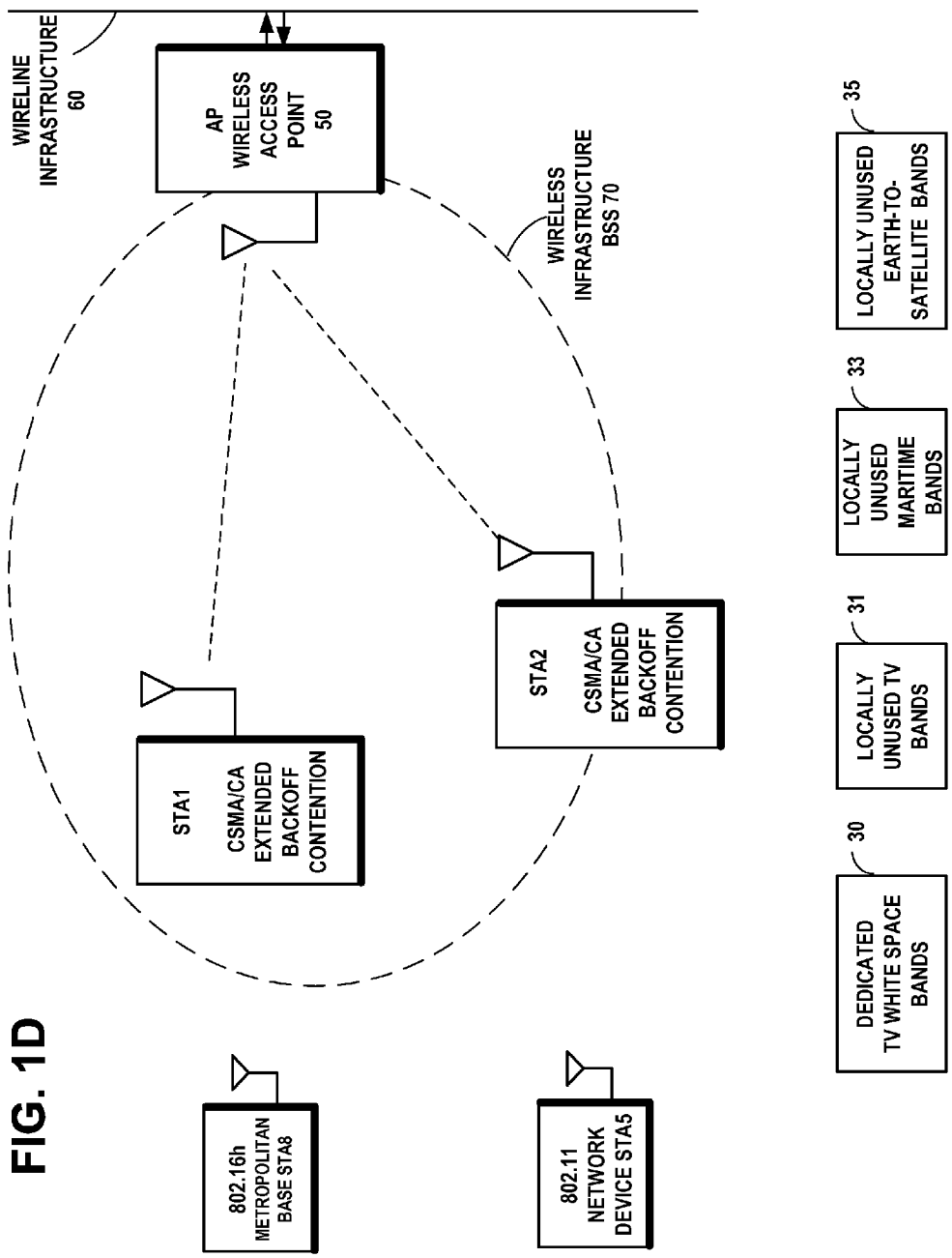
FIG. 1D shows the example network diagram of FIG. 1A, wherein the two client wireless devices perform a CSMA/CA extended backoff contention for access to the channel, according to an example embodiment of the invention.

FIG. 1D shows the example network diagram of FIG. 1A, wherein the two client wireless devices STA1 and STA2 perform a CSMA/CA extended backoff contention for access to the channel, according to an example embodiment of the invention. If the channel is sensed to be idle by the two client wireless devices STA1 and STA2, then the node is permitted to begin the transmission process. If the channel is sensed to be busy, then the two client wireless devices STA1 and STA2 delay transmission for a random period of time called the backoff interval. The backoff counter is decremented from this selected value as long as the channel is sensed idle.

An algorithm, such as binary exponential backoff, is used to randomly delay transmissions, in order to avoid collisions. The transmission is delayed by an amount of time that is the product of the slot time and a pseudo random number. Initially, each sender STA1 and STA2 will randomly wait 0 or 1 slot times. After a busy channel is detected, the senders STA1 and STA2 will randomly wait between from 0 to 3 slot times. After the channel is detected to be busy a second time, the senders STA1 and STA2 will randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

FIG. 1E shows the example network diagram of FIG. 1A, wherein the one of the client wireless devices, STA1, has succeeded in gaining access to the channel using the CSMA/CA extended backoff contention, and begins to transmit the next packet, according to an example embodiment of the invention. The other device STA2 will wait until the end of the next packet, as indicated by the NAV, before beginning another QP-CSMA-CA extended backoff sequence in an attempt to transmit its packet.

Figure 1F:
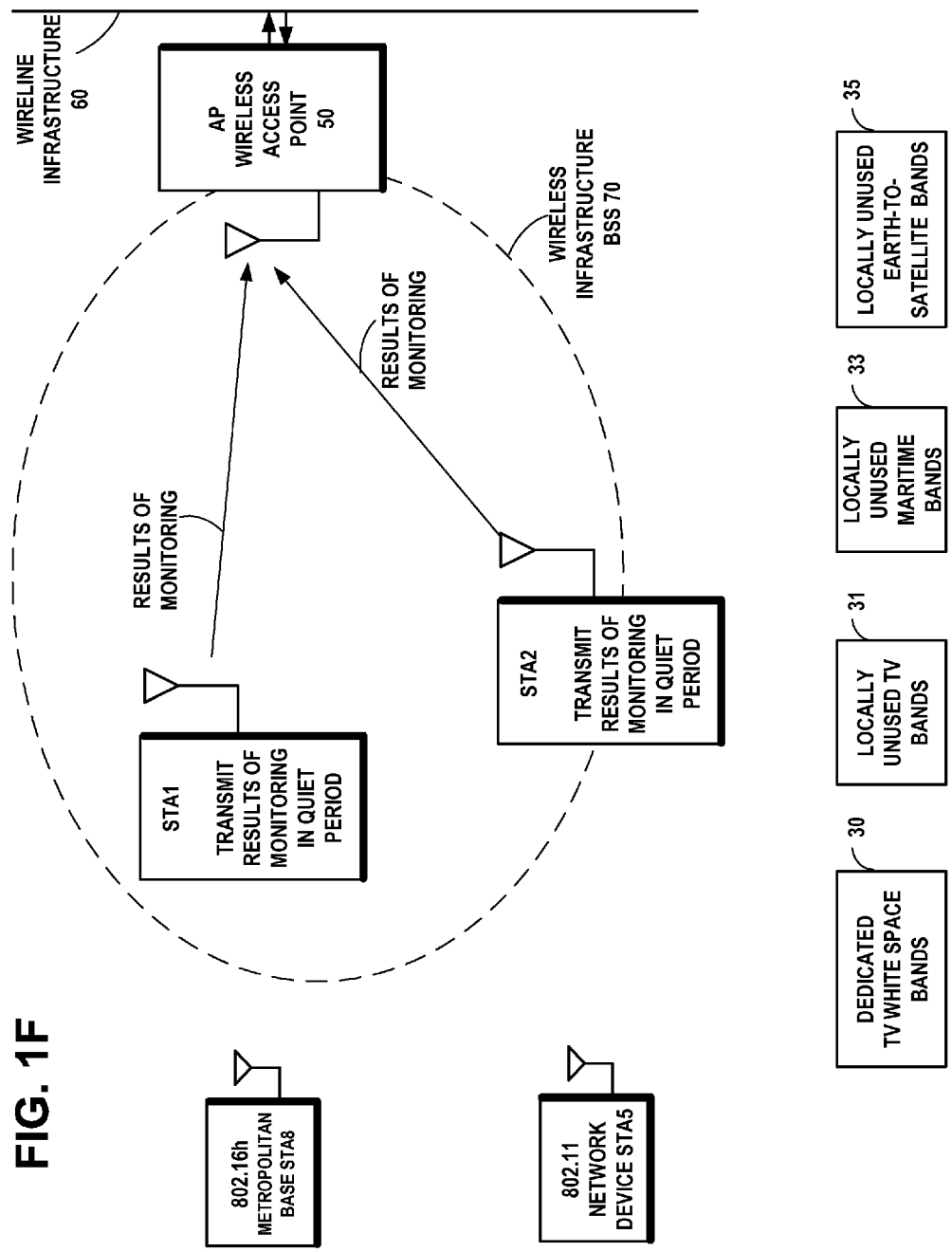
FIG. 1F shows the example network diagram of FIG. 1A, wherein at a later time, the two client wireless devices transmit the results of having monitored the ambient spectrum during the quiet period, to the access point, according to an example embodiment of the invention.

FIG. 1F shows the example network diagram of FIG. 1A, wherein at a later time, the two client wireless devices STA1 and STA2 transmit the results of having monitored the ambient spectrum during the quiet period, to the access point 50, according to an example embodiment of the invention. The STAs may send the results to other networks at any time. This information may be used by the access point 50 or forwarded by the access point 50 to a network coexistence management controller to determine whether communication resources of the white space bands need to be allocated to enable a fair usage of the local spectrum. Active coexistence between secondary networks using the white space bands is used for fairly sharing the available bandwidth among different heterogeneous secondary networks and accord the required preference for primary users of the band. If it is determined that white space bands need to be allocated to enable a fair usage of the local spectrum, then the access point 50 or network coexistence management controller may send reallocation directions in the form of a modified control information, to the client devices STA1 and/or STA2. The modified control information may include a command to use one or more reallocated channels, such as frequency channels, codes, or time slots, or a combination, as transmission resources. Thereafter, the client devices STA1 and STA2 may compete for transmission resources in the one or more reallocated channels, using a carrier sense multiple access with collision avoidance access method.

A network coexistence management controller may be responsible for making the decisions on the spectrum resource sharing with neighboring networks and coexistence related information exchange with them. The network coexistence management controller may serve one or more networks. It may collect information from associated networks and configure it via a control node of a wireless network, such as the access point 50. The network coexistence management controller may also obtain information from a TVWS database. From the collected information the network coexistence management controller may construct a spectrum map for the network and calculate the amount of resources for which the network is eligible in the current spectrum environment. The information is used in spectrum allocation. The network coexistence management controller may command a control node of a wireless network, such as the access point 50, based on the decisions it has made concerning allocation of resources to enable a fair usage of the local spectrum. In embodiments of the invention, the network coexistence management controller may reside in the access point 50.

FIG. 2 is an example flow diagram of operational steps in the client WLAN device STA1, for quiet period management in wireless networks to enhance coexistence of secondary networks in white space bands, according to an embodiment of the present invention. The steps of the flow diagram 200 of FIG. 2 may represent computer code instructions stored in the RAM and/or ROM memory of the device STA1, which when executed by the central processing units (CPU), carry out the functions of an example embodiment of the invention. The steps may be carried out in another order than shown and individual steps may be combined or separated into component steps.

Step 202: receiving control information in a wireless message in a communications channel from another device in a wireless network;

Step 204: receiving a packet having a duration in the communications channel in the wireless network;

Step 206: delaying transmission of a packet in the communications channel for an interval determined by the received control information;

Step 208: monitoring an ambient electromagnetic spectrum during the interval; and Step 210: competing for transmission resources in the communications channel, using a carrier sense multiple access with collision avoidance access method, after the interval.

Figure 3:
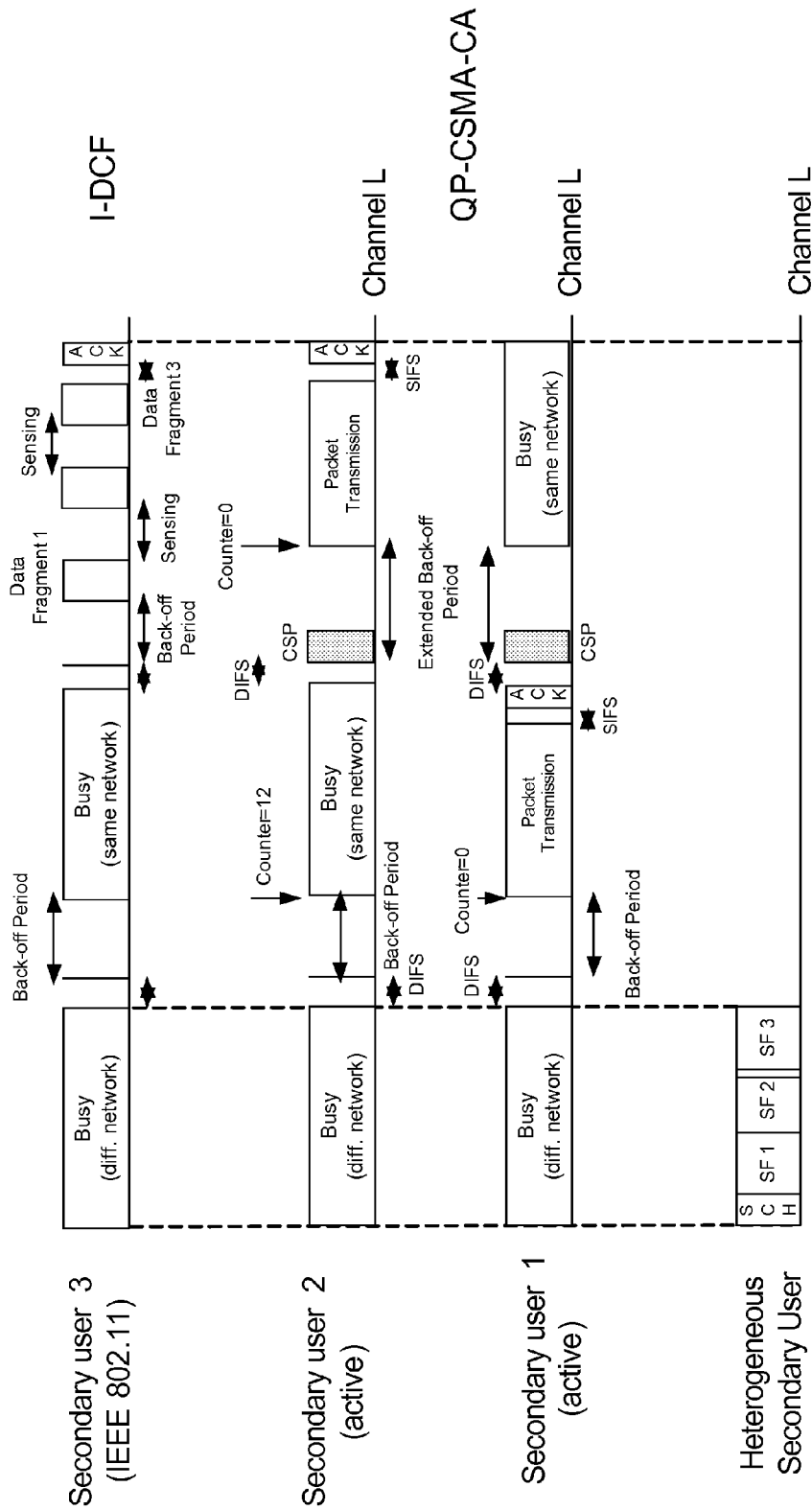
FIG. 3 is an example timing diagram for quiet-period carrier sense multiple access-collision avoidance (QP-CSMA-CA) and intermittent distributed coordination function (i-DCF) schemes with extended backoff and coordinated sensing period (CSP), according to an example embodiment of the invention.

FIG. 3 is a timing diagram for quiet-period carrier sense multiple access-collision avoidance (QP-CSMA-CA) and intermittent distributed coordination function (i-DCF) schemes with extended backoff and coordinated sensing period (CSP), according to an example embodiment of the invention.

To distinguish some of the example features of the invention, an example is given of a different scheme, an intermittent distributed coordination function (i-DCF) scheme, shown in the top timing diagram of FIG. 3. The intermittent distributed coordination function (i-DCF) scheme uses a dedicated and periodic sensing duration, $\tau$, within the data transmission phase in order to detect presence of incumbent signal sources. During these predefined durations, data packets are fragmented in order to accommodate periodic sensing. However, the control packets namely, RTS, CTS, and ACK packets are not fragmented. Since a successful data fragment should have a minimum of DATAmin bits for transmission between sensing intervals, larger data fragments cannot be transmitted. Therefore, this example different scheme leads to three serious drawbacks:

(i) If the remaining time between SIFS and initiation of sensing is not sufficient for an RTS, CTS, or an ACK packet, then this control packet is not transmitted until the end of the sensing duration. Therefore, the bandwidth for this time duration, is wasted.

(ii) If tr is smaller than the duration for DATAmin bits, no fragmentation is performed and the duration is wasted as well.

(iii) Significant overhead due to the need for sequence numbers for each of the fragments in data packets.

In accordance with an example embodiment of the invention, QP-CSMA-CA does not employ dedicated sensing durations within the data transmission intervals. QP-CSMA-CA exploits the existing random and exponential backoff mechanism for coordinated sensing, defined for conventional CSMA-CA mechanism, for the detection of already operating homogeneous and heterogeneous wireless networks in the same channel.

In accordance with an example embodiment of the invention, QP-CSMA-CA provides the CSP as part of the backoff phase of active 802.11 stations. The CSP is performed by all the designated stations in every CSP interval and it is scheduled by the AP. In accordance with an example embodiment, the duration of the proposed backoff with a guaranteed sensing duration or QP is larger than the regular backoff period.

This is illustrated in the middle and bottom timing diagrams of FIG. 3, where the secondary users 1 and 2 perform CSP during the second backoff phase. The first backoff phase is similar to the regular backoff in a conventional CSMA-CA scheme.

In accordance with an example embodiment of the invention, QP-CSMA-CA performs carrier sensing in the backoff phase, thereby enhancing spectrum utilization and avoiding data fragmentation. The data packet is not fragmented because the sensing only starts after the transmission has finished.

Figure 4:
FIG. 4 is an example frame structure of the packet containing the control information transmitted by the access point for quiet-period carrier sense multiple access-collision avoidance (QP-CSMA-CA), according to an example embodiment of the invention.

FIG. 4 is an example frame structure of the packet 100A containing the control information transmitted by the access point 50 for quiet-period carrier sense multiple access-collision avoidance (QP-CSMA-CA), according to an example embodiment of the invention. The frame structure may represent a beacon or other management frame sent by the access point 50. The following field elements tabulated in Table 1 are used for QP-CSMA-CA.

TABLE 1

Functional elements for QP-CSMA-CA sent by an AP

| | |
|---|---|
| STA Info Type | This field if set to 1, implies group addressing and when set to 2 implies individual addressing |
| STA Group Address ID | This field is valid when STA Info Type field is set to 1; only the group with the designated IDs are required to perform QP-CSMA-CA |
| CSP Start Offset | This field indicates the time value when to initiate QP |
| CSP Duration | The duration of QP for detection of multiple networks |
| CSP Interval | This field indicates the interval between two CSPs; |

In accordance with an example embodiment, the AP only sends an update (packet structure shown in FIG. 3) when any of the CSP parameters change. Alternatively, these elements can also be appended to the beacon frame periodically broadcasted by the AP to its constituent stations. This may reduce additional transmission of sensing requests. Initial sensing parameters are signaled when the STAs associate with an AP.

The STA Info Type field is introduced in order to schedule sensing for a subset of active stations (i.e., power management bit set to 1).

The CSP Start Offset element may be in time units or a time value.

The resulting example embodiments of the invention provide:

(i) More efficient use of the operating spectrum because of no dedicated sensing durations within the data transmission phase, leading to higher system throughput and reduced latency in data transmission;

(ii) Enhanced system throughput with maximum utilization of channels;

(iii) Exploitation of backoff periods for sensing of other coexisting IEEE 802.11ah and IEEE 802.15.4 g systems.

Figure 5:
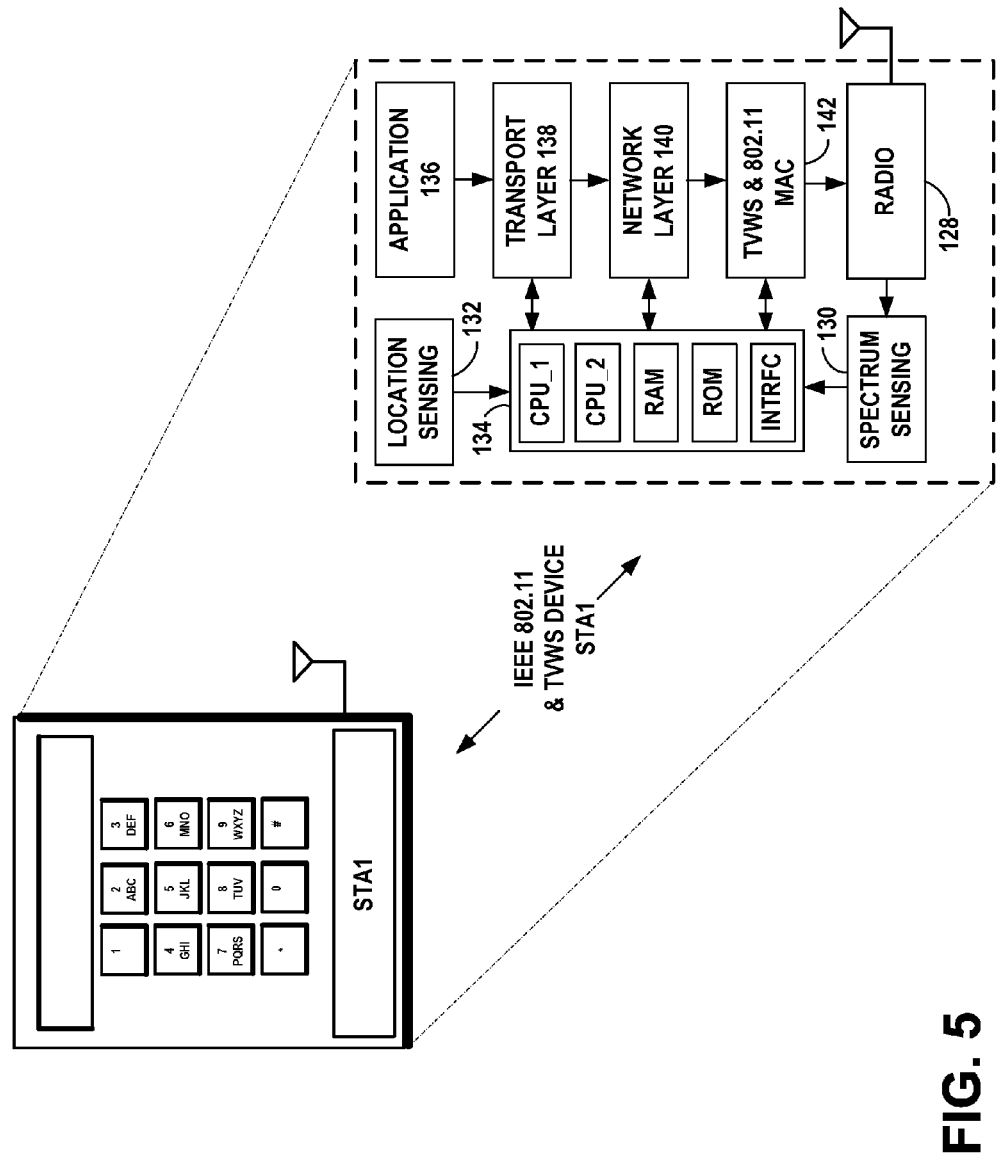
FIG. 5 is an example functional block diagram, illustrating an example TV white space wireless device configured to operate in additional RF spectrum white space bands wherein there are no primary user radios operating in the neighboring wireless networks, according to an example embodiment.

FIG. 5 is an example functional block diagram according to an example embodiment of the present invention, illustrating an example TV white space WLAN device STA1. The example device STA1 may include a protocol stack, including the radio 128 and IEEE 802.11 MAC 142, which may be based, for example, on the IEEE 802.11 WLAN standard. The MAC 142 may include integrated TV white space features. The protocol stack may also include a network layer 140, a transport layer 138, and an application program 136. The example device STA1 may include a processor 134 that may include a dual or multi-core central processing unit CPU_1 and CPU_2, a RAM memory, a ROM memory, and an interface for a keypad, display, and other input/output devices. A location sensor 134, such as a GPS may be included to establish the geographic location of the device STA1, and the location of the STA1 may be reported to the access point 50. The MAC 142 may include integrated TV white space features to communicate using the radio 128 in channels in the white space bands that may be allocated to the STA1, without mutual interference. The spectrum sensor 130 may sense the electromagnetic environment of the STA1 and may report it to the access point 50.

In an example embodiment, the interface circuits in FIG. 5 may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment, a memory register may be partitioned in the memory RAM to store the values for Functional elements shown in Table 1 for QP-CSMA-CA that have been sent by the AP 50

An example embodiment of the access point device 50 may have similar components and organization to that shown for the STA1 in FIG. 5.

An example embodiment of the apparatus (device STA1 of FIG. 5), comprises:

at least one processor (CPU_1 and/or CPU_2 of FIG. 5);

at least one memory (RAM and/or ROM of FIG. 5) including computer program code (flow diagram 200 of FIG. 2);

the at least one memory and the computer program code configured to, with the at least one processor, cause the apparatus at least to:

receive control information (100A of FIG. 1A) in a wireless message in a communications channel from another device in a wireless network (70);

receive a packet (data traffic of FIG. 1B) having a duration in the communications channel in the wireless network;

delay transmission (FIG. 1C) of a packet (data traffic of FIG. 1E) in the communications channel for an interval (quiet period QP) determined by the received control information;

monitor an ambient electromagnetic spectrum (FIG. 1C) during the interval; and compete for transmission resources (FIG. 1D) in the communications channel, using a carrier sense multiple access with collision avoidance access method, after the interval.

Figure 6:
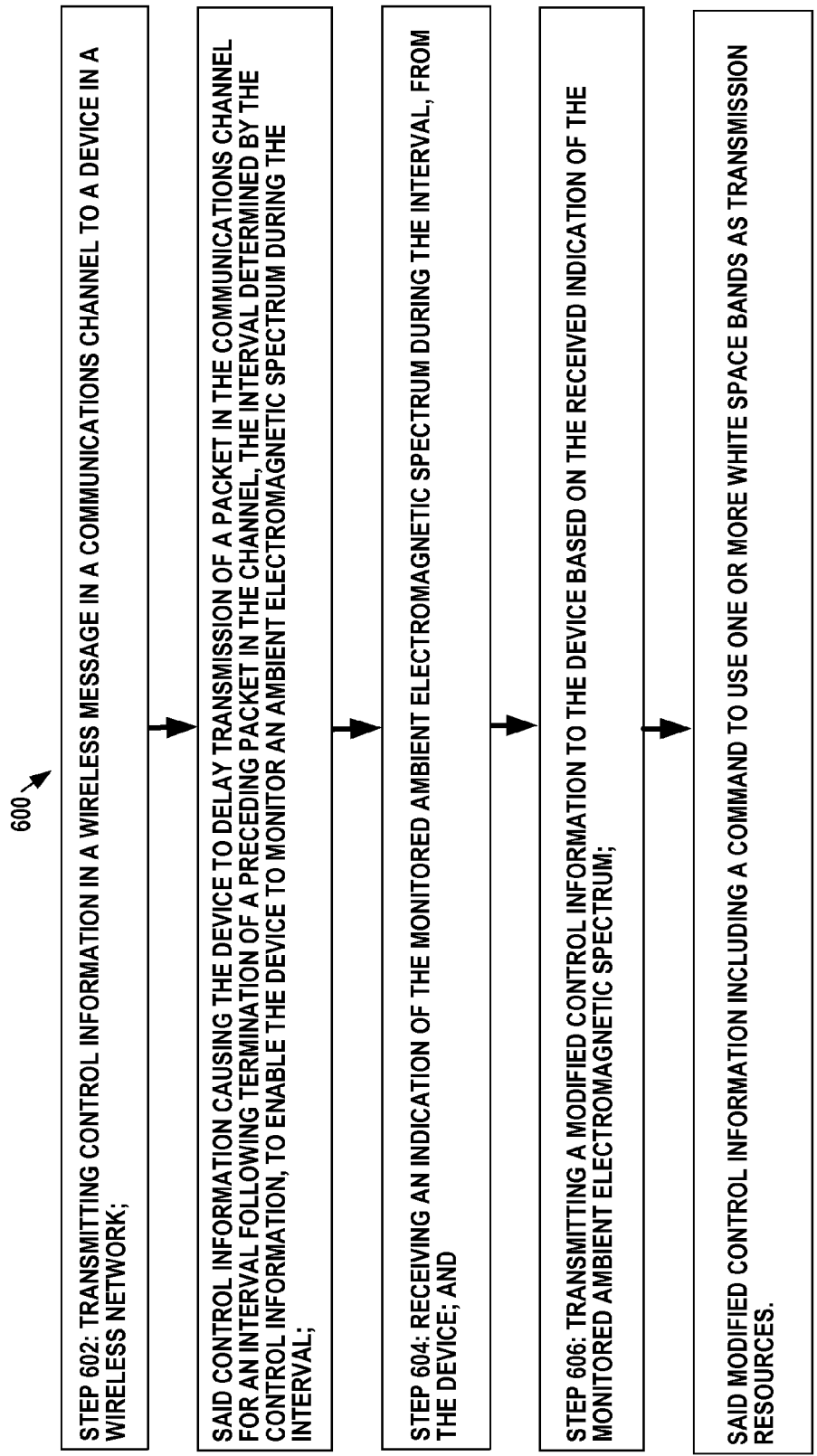
FIG. 6 is an example flow diagram of operational steps in the access point device, for quiet period management in wireless networks to enhance coexistence with other wireless networks, according to an embodiment of the present invention.

FIG. 6 is an example flow diagram of operational steps in the access point device 50, for quiet period management in wireless networks to enhance coexistence of secondary networks in white space bands, according to an example embodiment of the present invention. The steps of the flow diagram 600 of FIG. 6 may represent computer code instructions stored in the RAM and/or ROM memory of the access point device (similar to that shown in FIG. 5), which when executed by the central processing units (CPU) (similar to that shown in FIG. 5), carry out the functions of an example embodiment of the invention. The steps may be carried out in another order than shown and individual steps may be combined or separated into component steps.

Step 602: transmitting control information in a wireless message in a communications channel to a device in a wireless network;

said control information causing the device to delay transmission of a packet in a communications channel for an interval following termination of a preceding packet in the channel, the interval determined by the control information, to enable the device to monitor an ambient electromagnetic spectrum during the interval;

Step 604: receiving an indication of the monitored ambient electromagnetic spectrum during the interval, from the device; and Step 606: transmitting a modified control information to the device based on the received indication of the monitored ambient electromagnetic spectrum;

said modified control information including a command to use one or more white space bands as transmission resources.

In an example embodiment of the invention, STA1 may transmit an indication of the monitored ambient electromagnetic spectrum during the quiet period (QP) interval, to the access point 50. The monitored ambient electromagnetic spectrum may include a measurement of potentially interfering signals in the channel from other networks. The access point 50 may determine that the measured level of the potentially interfering signals from other networks, as presented by the indication transmitted by STA1, may justify changing the quiet period (QP) interval or schedule for STA1. Accordingly, the access point 50 may prepare and transmit to STAT a modified control information based on the transmitted indication of the monitored ambient electromagnetic spectrum. The modified control information may include a command to use one or more white space bands as transmission resources. Thereafter, STA1 may compete for transmission resources in the one or more white space bands, using a carrier sense multiple access with collision avoidance access method.

IEEE 802.11 Independent Basic Service Set (IBSS) Ad Hoc Network

Example embodiments of the invention may be applied in an IEEE 802.11 independent basic service set (IBSS) operating as an ad hoc network, without an access point. Since there is no AP, the mobile wireless device that starts the ad hoc network may begin by resetting its TSF timer to zero and transmitting a beacon, choosing a beacon period. This establishes the basic beaconing process for this ad hoc network. After the ad hoc network has been established, each mobile wireless device in the ad hoc network may attempt to send a beacon after the target beacon transmission time (TGTT) arrives. To minimize actual collisions of the transmitted beacon frames on the medium, each device in the ad hoc network may choose a random delay value which it may allow to expire before it attempts its beacon transmission.

In example embodiments of the invention, after the ad hoc network has been established, the mobile devices may collaborate on a distributed basis to exchange control information to schedule quiet periods (QP), according to an example embodiment of the invention. In alternate example embodiments of the invention, the mobile wireless device that starts the ad hoc network may begin by including the control information to schedule quiet periods (QP), in the beacon that it transmits to the other mobile wireless devices that join the ad hoc network.

In example embodiments of the invention, the control information to schedule quiet periods (QP), may be contained in beacon packets received in the communications channel from one or more of the other mobile wireless devices in the ad hoc network. The control information may include group addressing of a selected sub-plurality of a plurality of wireless devices in the ad hoc network. The control information may indicate a time value when to initiate the interval of the quiet periods (QP). The control information may indicate a duration of the interval of the quiet periods (QP) for detection of other networks. The control information may indicate a duration between occurrence of two consecutive ones of the intervals of the quiet periods (QP).

In example embodiments of the invention, the control information to schedule quiet periods (QP), may be contained in a management frame other than a beacon, received in the communications channel from one or more of the other mobile wireless devices in the ad hoc network.

In example embodiments of the invention, after the channel has been released at the end of the last frame, the mobile wireless devices in the ad hoc network may employ a spectrum sensing capability during the SIFS interval or DIFS interval, to detect whether a carrier signal is present indicating the channel is busy. A carrier sensing scheme may be used wherein the mobile wireless devices in the ad hoc network wishing to transmit data, first listen to the channel for a predetermined DIFS or SIFS amount of time to determine whether or not another node is transmitting on the channel within the wireless range.

In example embodiments of the invention, after the SIFS interval or DIFS interval, the mobile wireless devices in the ad hoc network may monitor the ambient spectrum during the quiet period (QP), using quiet-period carrier sense multiple access-collision avoidance (QP-CSMA-CA).

In example embodiments of the invention, after the quiet period (QP), the mobile wireless devices in the ad hoc network may perform a CSMA/CA extended backoff contention for access to the channel. If the channel is sensed to be idle by a mobile wireless devices, then the node is permitted to begin the transmission process. If the channel is sensed to be busy, then the mobile wireless devices delay transmission for a random period of time called the backoff interval. The backoff counter is decremented from this selected value as long as the channel is sensed idle.

In example embodiments of the invention, one of the mobile wireless devices in the ad hoc network may succeed in gaining access to the channel using the CSMA/CA extended backoff contention, and begin to transmit the next packet. The other mobile wireless devices in the ad hoc network will wait until the end of the next packet, as indicated by the NAV, before beginning another QP-CSMA-CA extended backoff sequence in an attempt to transmit its packet.

Example embodiments of the invention operate in all network topologies, including an IEEE 802.11 Basic Service Set (BSS), a Peer-to-peer BSS, a Mesh BSS (MBSS), and a Tunneled Direct Link BSS (IEEE 802.11z). Example embodiments of the invention enhance the CSMA/CA access method operating in all frequency bands, for example from country specific white spaces between 50 and 700 MHz, the 900 MHz ISM band, the 2.4 GHz ISM band, the 5.0 GHz band for the IEEE 802.11 ac standard, up beyond the 60 GHz band for the IEEE 802.11 ad standard.

Figure 7:
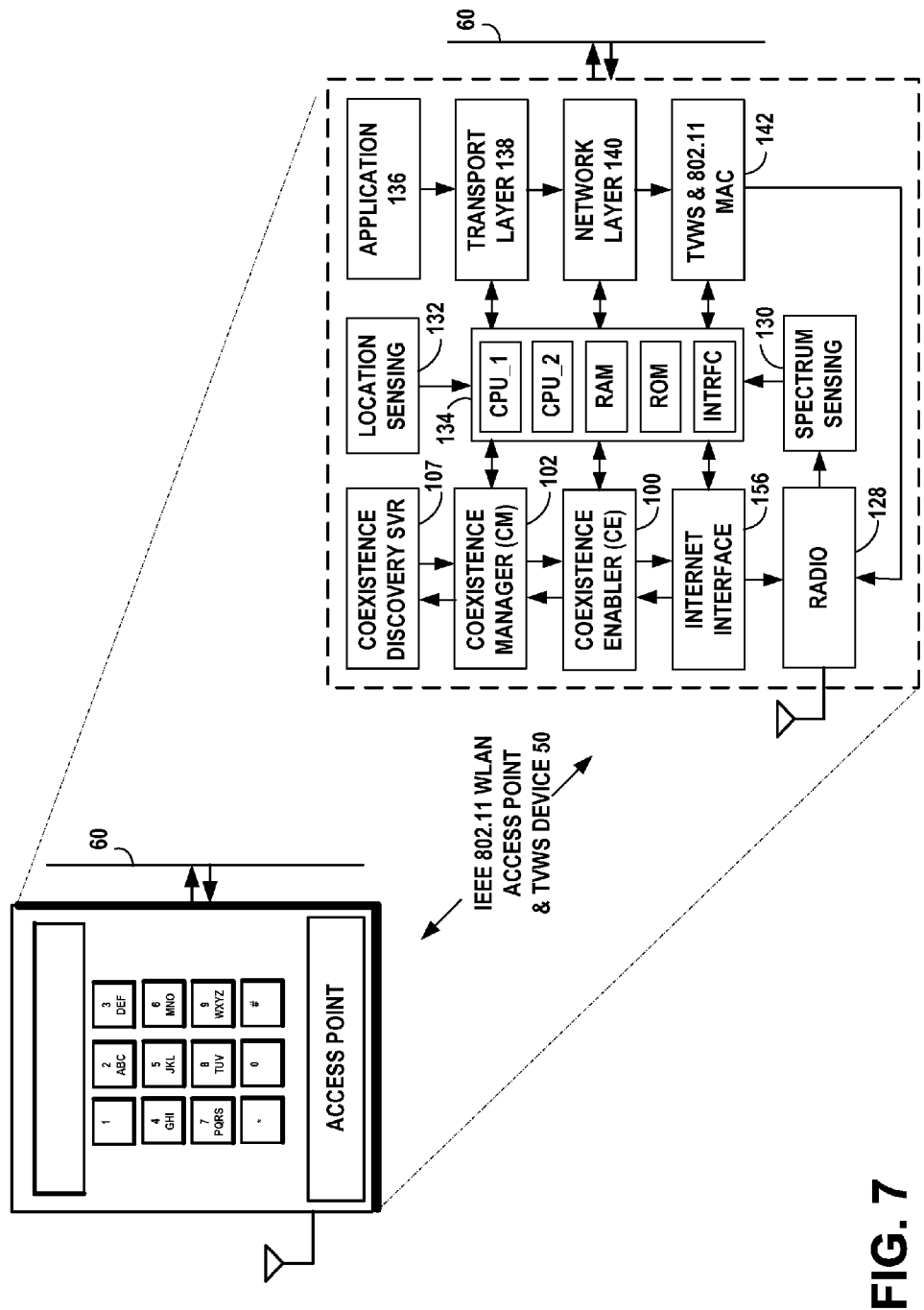
FIG. 7 is an example functional block diagram according to an example embodiment of the present invention, illustrating an example of the access point 50 as a TV white space wireless device including the network controller or coexistence manager and the control node or coexistence enabler for a network. The access point 50 may be configured to operate in additional RF spectrum white space bands wherein there are no primary user radios operating in the neighboring wireless networks.

D. Access Point with Coexistence Manager for Quiet Period Management in WLANs for Coexistence with Other Wireless Networks FIG. 7 is an example functional block diagram according to an embodiment of the present invention, illustrating an example TV white space WLAN access point 50 including the control node or coexistence enabler 100 for the network 70 and network controller or coexistence manager 102. The example device 50 includes a protocol stack for Network 70, including the radio 128 and the Network 70 IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example AP device 50 may include a processor 134 that includes a dual core central processing unit CPU_1 and CPU_2, a RAM memory, a ROM memory, and an interface for a keypad, display, and other input/output devices. A location sensor 134, such as a GPS may be included to establish the geographic location of the AP device 50, and the location of the AP device 50 is reported to the network controller or coexistence manager 102. The coexistence enabler 100 may send resource requests to the coexistence manager 102. The MAC 142 may include integrated TV white space features to communicate using the radio 128 in channels in the TV white spaces band reallocated by the coexistence manager 102, without mutual interference. The spectrum sensor 130 may sense the electromagnetic environment of the AP device 50 and reports it to the coexistence manager 102.

Control node according to an embodiment of the present invention, such as the CE 100, obtains information required for coexistence from TV Band Device (TVBD) network or device. This includes configuration and control of measurements performed by TVBD network or device. The CE forwards the collected information to its associated network controller, such as CM 102. The information may be formatted in standard format. Also, the CE provides reconfiguration commands and control information to TVBD network or device, corresponding to coexisting decisions received from the associated CM. The CE may reside in a TVBD device, e.g. in access point, base station, or mesh point. There is one CE in a network. It may collect the information from the other network nodes using radio standard specific means.

A network controller, such as the CM 102 may be responsible for making the decisions on the spectrum resource sharing, discovery of other CMs controlling neighboring networks and coexistence related information exchange with them. The CM may serve one or more networks. It may collect information from associated networks and configure it via a control node of a wireless network, such as CE 100. The information obtained during the quiet periods may be aggregated and forwarded to the co-existence manger. The CM may also obtain information from the TVWS database. From the collected information the CM may construct the spectrum map for the network, and it may calculate the amount of resources for which the network is eligible in the current spectrum environment. The information may be used in spectrum allocation. The CM may command its CE(s) 100 based on the decisions it and its neighboring CMs have made. It is optional whether there is a hierarchy between CMs. The CM may reside in a TVBD device such as the access point 50, or in the network.

A wireless network discovery apparatus or entity, such as the Coexistence Discovery and Information Server (CDIS) 107 may assist the CMs 102 to discover possible coexistence conflicts of the networks it controls, and to discover the CMs with which the conflicts may be solved. The CDIS may support the discovery of CMs by keeping a record of the existing CMs and location of the networks they control. It may provide a list of potential neighboring CMs for the CMs controlling new or moving networks. Such CDIS server is needed for discovering neighboring networks, because all the networks are not expected to support the same radio connectivity and thus cannot discover each other directly over the radio interface. The CDIS may have other functions such as storing more information of each CM, statistics of the spectrum use, or providing common Quiet Period for spectrum sensing. The CDIS may also use the information of primary users due to an optional interface to TVWS database. The CDIS 107 may reside in a TVBD device such as AP device 50, or in the network.

The interface circuits in FIG. 7 may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

Figure 8:
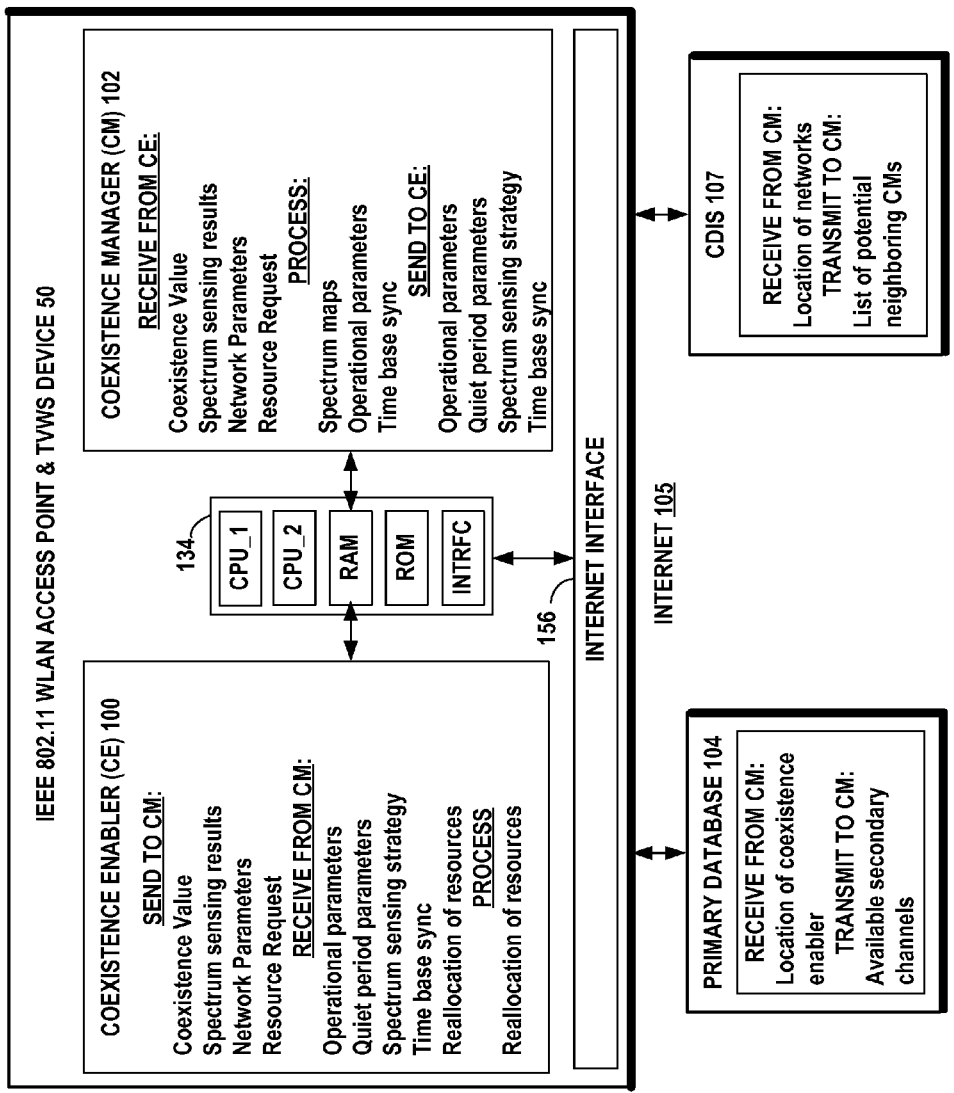
FIG. 8 is an example functional block diagram according to an example embodiment of the present invention, illustrating the IEEE 802.11 WLAN access point and TVWS device 50, which includes the network controller or coexistence manager and the control node or coexistence enabler, communicating over the Internet with the primary database and the coexistence network element Coexistence Discovery & Info Server (CDIS).

FIG. 8 is an example functional block diagram according to an embodiment of the present invention, illustrating the IEEE 802.11 WLAN access point & TVWS device 50 that includes both the network controller or coexistence manager 102 and the control node or coexistence enabler 100. The coexistence manager 102 may communicate with the primary database 104 and the coexistence and wireless network discovery element Coexistence Discovery & Info Server (CDIS) 107 via the Internet interface 156. The coexistence manager 102 may access the primary database 104 to obtain available secondary channels in the TV band white space. The coexistence manager 102 may access the coexistence and wireless network discovery element Coexistence Discovery & Info Server (CDIS) 107 to obtain potential neighbor networks' addresses. The coexistence manager 102 may send resource reallocation messages to the coexistence enabler 100. The example coexistence manager 102 may include a processor 154 that includes a dual core central processing unit CPU_1 and CPU_2, a RAM memory, a ROM memory, and an interface for input/output devices. The database interface 156 may provide the interface to the primary database 104 and the coexistence network element Coexistence Discovery & Info Server (CDIS) 107. The CDIS 107 may reside in the AP device 50 device, or in the network.

In an example embodiment of the invention, in a first process the Coexistence Enabler (CE) 100 may calculate a Coexistence Value (CV) from some parameters of the IEEE 802.11 WLAN NETWORK 70. The CE 100 may transmit a CV value to its CM 102, which may further share it with other CMs of all neighboring networks. In an example embodiment of the invention, in a second process, the CE 100 may transmit its network capabilities to its CM 102, which may share them with the same other CMs of all neighboring networks. In an example embodiment of the invention, in a third process, the spectrum map creation process is performed by the CM 102 from the information received from the CE 100, the primary database 104 and information from the CMs of neighboring networks. The information of these three processes is used when the CE 100 identifies an excess resource need in its network and sends a resource request (RR) containing the amount of additional resources it needs to its CM 102. Each CM 102 has received the CV, the spectrum map and the network capabilities of its own network under CE 100 and neighboring networks. The CM 102 processes the RR, and if an allocation analysis is needed, it uses the CVs of the requesting network and its neighboring networks to evaluate whether the requesting network needing more resources is eligible to for the amount of resources requested in the RR. If the network is eligible to the requested additional resources, its CM 102 may then communicate a new resources allocation to the other CMs of its neighboring networks, or else the CM 102 may inform CE 100 that the network requesting the additional resources is not eligible for the requested resources.

In an example embodiment of the invention, certain parameters provide a good and/or practical representation of the eligibility level to the spectrum resources. The Coexistence Value (CV) has to be counted with similar methods for each network. Some candidate parameters for the Coexistence Value include: the number of nodes per network (with particular counting method), the current allocation usage level, and the network capabilities. A particular parameter priority may be used for "tuning the eligibility" among the networks under one CM.

In an example embodiment of the invention, the access point 50 may monitor ambient electromagnetic spectrum during the quiet period (QP) interval. The monitored ambient electromagnetic spectrum may include a measurement of potentially interfering signals in the channel from other networks. The access point 50 may determine that the measured level of the potentially interfering signals from other networks, as measured by the access point 50, may justify changing the quiet period (QP) interval or schedule for either STA1, STA2, or both client devices. Accordingly, the access point 50 may prepare and transmit to STA1, STA2, or both client devices, a modified control information based on the monitored ambient electromagnetic spectrum sensed by the access point 50. The modified control information may include a command to STA1, STA2, or both client devices to use one or more white space bands as transmission resources. Thereafter, STA1, STA2, or both client devices may compete for transmission resources in the one or more white space bands, using a carrier sense multiple access with collision avoidance access method.

Figure 9:
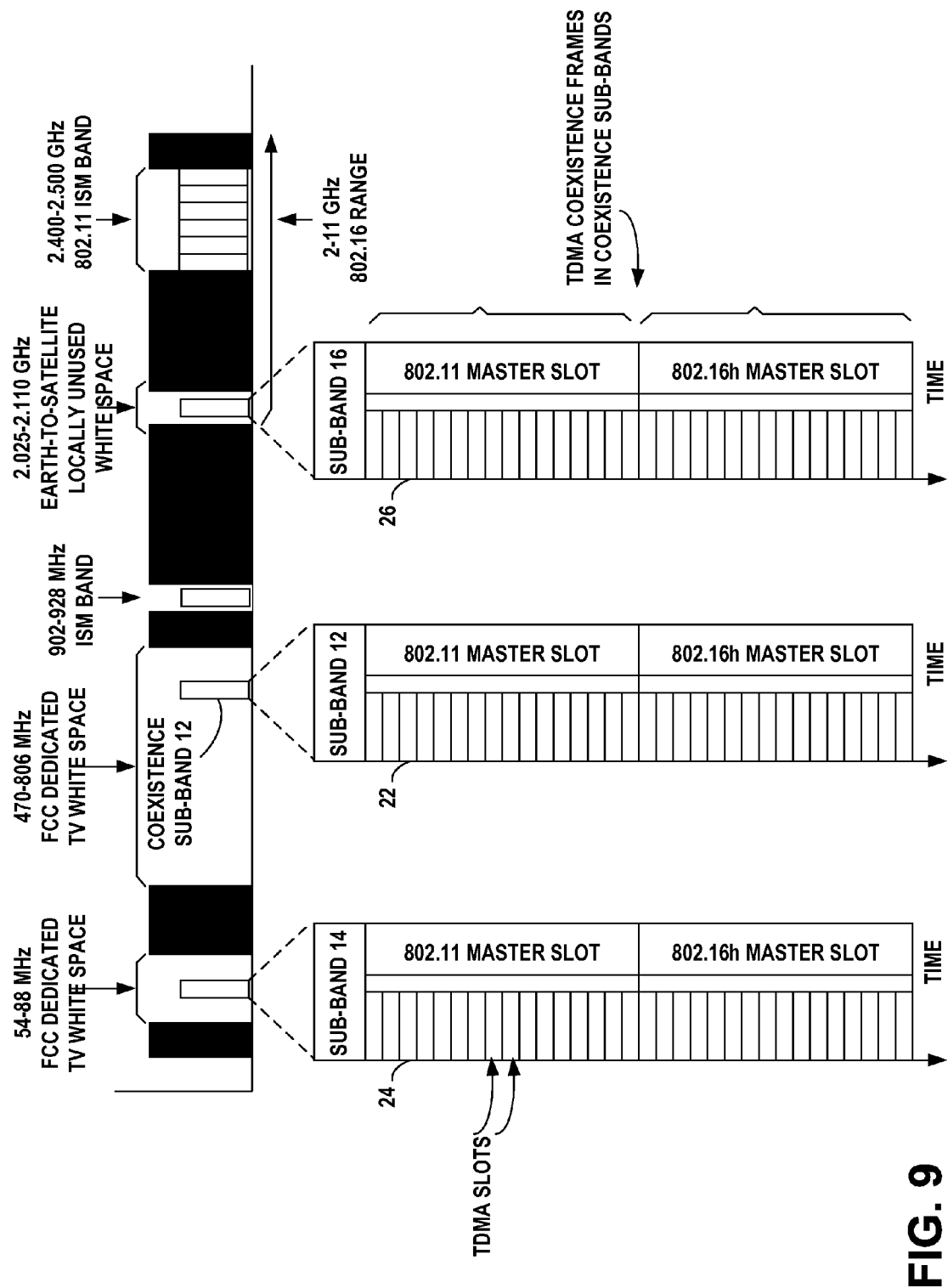
FIG. 9 is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention.

FIG. 9 is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention. License-exempt access to these bands as a secondary use for coexistence of networks requesting additional resources, may include restrictions on geographic location, transmission power, range, and bandwidth of the transmissions of the requesting networks.

For example, the 802.11 WLAN standards specify an OFDM-based physical layer with a bandwidth of 20 MHz channel separation. At 11 MHz from the center of the channel, the energy is approximately 20 dB lower than the maximum signal level. Further away from the center frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space band at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, is a good candidate for coexistence of an 802.11 WLAN wireless LAN channel.

FIG. 9 shows an example of the location of the white spaces in the RF spectrum and example TDMA coexistence frames in the white space bands, showing the freely available time slots before any networks have been allocated slots. The white spaces include the FCC dedicated TV white space 54-88 MHz band, the FCC dedicated TV white space 470-806 MHz band, and locally unused the earth station-to-satellite white space band 2.025 GHz to 2.110 GHz.

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

The example coexistence technique illustrated here for each sub-band 12, 14, and 16, is time division multiplexing of the slots in TDMA coexistence frames allocated to different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA8. The IEEE 802.11 WLAN station, such as the WLAN access point 50, may include Internet access and geo-location capability. The TDMA coexistence frame may be divided into a IEEE 802.11 master slot network allocation group and an IEEE 802.16h master slot network allocation group. The IEEE 802.11 master slot network allocation group carries twelve free IEEE 802.11 WLAN white space slots. The IEEE 802.16h master slot network allocation group carries the twelve free IEEE 802.16h WMAN white space slots.

According to an example embodiment, client wireless device STA1 monitors the ambient spectrum during the quiet period QP and uses the quiet-period carrier sense multiple access-collision avoidance (QP-CSMA-CA) to sense whether there are interfering signals present, for example signals from neighboring IEEE 802.11 WLAN stations operating in a particular band, for example, the 900 MHz ISM band.

According to an example embodiment, client wireless device STA1 transmits the results of having monitored the ambient spectrum during the quiet period QP, to the access point 50, according to an example embodiment of the invention. This information may be used by the coexistence manager 102 in the access point 50 to determine whether communication resources of the white space bands need to be allocated to enable a fair usage of the local spectrum. If it is determined that white space bands need to be allocated to enable a fair usage of the local spectrum, then the coexistence manager 102 in the access point 50 with send reallocation directions in the form of a modified control information, to the client device STA1. The modified control information may include a command to use one or more white space bands as transmission resources. Thereafter, the client device STA1 may compete for transmission resources in the one or more white space bands, using a carrier sense multiple access with collision avoidance access method.

According to an example embodiment, coexistence manager 102 in FIGS. 7 and 8, may communicate with one or more other coexistence managers managing neighboring wireless networks, which advertise white space slots allocated but not used in a coexistence band. In an example embodiment, the coexistence manager 102 may allocate eight TVWS coexistence band slots in sub-band 12 of FIG. 9, for use by the 802.11 network of STA1, which had been advertised as allocated but not used by neighboring wireless networks. This may free up a corresponding eight slots in the 900 MHz ISM band, which had been previously used by the 802.11 network of STA1.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments of the invention have been disclosed, a person skilled in the art will understand that changes can be made to the specific example embodiments without departing from the spirit and scope of the invention.

What is claimed is:

1. A method, comprising:
receiving control information in a wireless message in a communications channel from another device in a wireless network, indicating a quiet period during an extended backoff phase between termination of a preceding packet in the communications channel and prior to a next packet in the communications channel, for detection of interfering networks;
receiving a packet having a duration in the communications channel in the wireless network;
delaying transmission of a packet in the communications channel for an interval of the quiet period during the extended backoff phase between termination of the received packet in the communications channel and prior to the next packet in the communications channel, determined by the received control information;
monitoring an ambient electromagnetic spectrum during the interval; and
competing for transmission resources in the communications channel, using a carrier sense multiple access with collision avoidance access method, after the interval.

2. The method 1, wherein said competing for transmission resources further comprises:
monitoring the channel and if it is sensed to be busy, then further delaying transmission of a packet for a random backoff interval.

3. The method 1, wherein the monitoring the ambient electromagnetic spectrum during the interval comprises monitoring activity from other networks.

4. The method 1, wherein the wireless message is a beacon packet received in the communications channel from an access point.

5. The method 1, wherein the control information includes group addressing of a selected sub-plurality of a plurality of wireless devices in the network.

6. The method 1, wherein the control information indicates a time value when to initiate the interval.

7. The method 1, further comprising:
transmitting an indication of the monitored ambient electromagnetic spectrum during the interval, to the other device;
receiving a modified control information from the other device based on the transmitted indication of the monitored ambient electromagnetic spectrum;
said modified control information including a command to use one or more channels as transmission resources; and
competing for transmission resources in the one or more channels, using a carrier sense multiple access with collision avoidance access method.

8. An apparatus, comprising:
at least one processor;
at least one memory including computer program code;
the at least one memory and the computer program code configured to, with the at least one processor, cause the apparatus at least to:
receive control information in a wireless message in a communications channel from another device in a wireless network, indicating a quiet period during an extended backoff phase between termination of a preceding packet in the communications channel and prior to a next packet in the communications channel, for detection of interfering networks;
receive a packet having a duration in the communications channel in the wireless network;
delay transmission of a packet in the communications channel for an interval of the quiet period during the extended backoff phase between termination of the received packet in the communications channel and prior to the next packet in the communications channel, determined by the received control information;
monitor an ambient electromagnetic spectrum during the interval; and
compete for transmission resources in the communications channel, using a carrier sense multiple access with collision avoidance access method, after the interval.

9. The apparatus of claim 8, further comprising:
the at least one memory and the computer program code configured to, with the at least one processor, cause the apparatus at least to:
monitor the channel during competing for transmission resources, and if it is sensed to be busy, then further delay transmission of a packet for a random backoff interval.

10. The apparatus of claim 8, wherein the monitoring the ambient electromagnetic spectrum during the interval comprises monitoring activity from other networks.

11. The apparatus of claim 8, wherein the wireless message is a beacon packet received in the communications channel from an access point.

12. The apparatus of claim 8, wherein the control information includes group addressing of a selected sub-plurality of a plurality of wireless devices in the network.

13. The apparatus of claim 8, wherein the control information indicates a time value when to initiate the interval.

14. The apparatus of claim 8, further comprising:
the at least one memory and the computer program code configured to, with the at least one processor, cause the apparatus at least to:
transmit an indication of the monitored ambient electromagnetic spectrum during the interval, to the other device;
receive a modified control information from the other device based on the transmitted indication of the monitored ambient electromagnetic spectrum;
said modified control information including a command to use one or more channels as transmission resources; and
compete for transmission resources in the one or more channels, using a carrier sense multiple access with collision avoidance access method.

15. A computer program product comprising computer executable program code recorded on a computer readable, non-transitory storage medium, the computer executable program code comprising:
code for receiving control information in a wireless message in a communications channel from another device in a wireless network, indicating a quiet period during an extended backoff phase between termination of a preceding packet in the communications channel and prior to a next packet in the communications channel, for detection of interfering networks;
code for receiving a packet having a duration in the communications channel in the wireless network;
code for delaying transmission of a packet in the communications channel for an interval of the quiet period during the extended backoff phase between termination of the received packet in the communications channel and prior to thenext packet in the communications channel, determined by the received control information;
code for monitoring an ambient electromagnetic spectrum during the interval; and
code for competing for transmission resources in the communications channel, using a carrier sense multiple access with collision avoidance access method, after the interval.

16. A method, comprising:
transmitting control information in a wireless message in a communications channel to a device in a wireless network, indicating a quiet period during an extended backoff phase between termination of a preceding packet in the communications channel and prior to a next packet in the communications channel, for detection of interfering networks;
said control information causing the device to delay transmission of a packet in the communications channel for an interval following termination of a preceding packet in the channel, the interval being the quiet period during the extended backoff phase between termination of the preceding packet in the communications channel and prior to the next packet in the communications channel, determined by the control information, to enable the device to monitor an ambient electromagnetic spectrum during the interval;

receiving an indication of the monitored ambient electromagnetic spectrum during the interval, from the device.

17. An apparatus, comprising:
at least one processor;
at least one memory including computer program code;
the at least one memory and the computer program code configured to, with the at least one processor, cause the apparatus at least to:
transmit control information in a wireless message in a communications channel to a device in a wireless network, indicating a quiet period during an extended backoff phase between termination of a preceding packet in the communications channel and prior to a next packet in the communications channel, for detection of interfering networks;
said control information causing the device to delay transmission of a packet in the communications channel for an interval following termination of a preceding packet in the channel, the interval being the quiet period during the extended backoff phase between termination of the preceding packet in the communications channel and prior to the next packet in the communications channel, determined by the control information, to enable the device to monitor an ambient electromagnetic spectrum during the interval; and
receive an indication of the monitored ambient electromagnetic spectrum during the interval, from the device.

18. The apparatus of claim 17, further comprising:
the at least one memory and the computer program code configured to, with the at least one processor, cause the apparatus at least to:
transmit a modified control information to the device based on the received indication of the monitored ambient electromagnetic spectrum;
said modified control information including a command to use one or more channels as transmission resources.

19. A computer program product comprising computer executable program code recorded on a computer readable, non-transitory storage medium, the computer executable program code comprising:
code for transmitting control information in a wireless message in a communications channel to a device in a wireless network, indicating a quiet period during an extended backoff phase between termination of a preceding packet in the communications channel and prior to a next packet in the communications channel, for detection of interfering networks;
said control information causing the device to delay transmission of a packet in the communications channel for an interval following termination of a preceding packet in the channel, the interval being the quiet period during the extended backoff phase between termination of the preceding packet in the communications channel and prior to the next packet in the communications channel, determined by the control information, to enable the device to monitor an ambient electromagnetic spectrum during the interval; and
code for receiving an indication of the monitored ambient electromagnetic spectrum during the interval, from the device.

* * * * *